United States Patent
Klein et al.

(10) Patent No.: US 12,486,320 B1
(45) Date of Patent: Dec. 2, 2025

(54) COMPOSITIONS AND METHODS FOR TREATMENT OF CENTRAL NERVOUS SYSTEM (CNS) AUTOIMMUNE ASSOCIATED DISEASES OR DISORDERS

(71) Applicants: Robyn S. Klein, St. Louis, MO (US); Jessica L. Williams, St. Louis, MO (US)

(72) Inventors: Robyn S. Klein, St. Louis, MO (US); Jessica L. Williams, St. Louis, MO (US)

(73) Assignee: Washington University, St. Louis, MO (US)

( * ) Notice: Subject to any disclaimer, the term of this patent is extended or adjusted under 35 U.S.C. 154(b) by 491 days.

(21) Appl. No.: 16/247,709

(22) Filed: Jan. 15, 2019

Related U.S. Application Data

(60) Provisional application No. 62/617,523, filed on Jan. 15, 2018.

(51) Int. Cl.
C07K 16/24 (2006.01)
G01N 33/68 (2006.01)

(52) U.S. Cl.
CPC ....... *C07K 16/244* (2013.01); *G01N 33/6866* (2013.01); *C07K 2317/24* (2013.01); *G01N 2333/555* (2013.01)

(58) Field of Classification Search
CPC .......................... C07K 16/244; G01N 33/6866
See application file for complete search history.

(56) References Cited

U.S. PATENT DOCUMENTS

| | | | |
|---|---|---|---|
| 8,715,637 B2 | 5/2014 | Kotenko et al. | |
| 9,272,029 B2 | 3/2016 | Chang et al. | |
| 2010/0227813 A1* | 9/2010 | Sheppard | C07K 14/715 424/85.1 |
| 2014/0056889 A1* | 2/2014 | Morimoto | A61P 17/06 424/133.1 |
| 2015/0266875 A1* | 9/2015 | Masse | A61P 5/00 514/228.5 |
| 2016/0159773 A1* | 6/2016 | Saitoh | A61P 17/06 514/235.5 |

FOREIGN PATENT DOCUMENTS

| | | | |
|---|---|---|---|
| EP | 2669296 | 4/2013 | |
| WO | WO-2012153078 A1 * | 11/2012 | C07K 14/54 |

OTHER PUBLICATIONS

Baker et al., Critical appraisal of animal models of multiple sclerosis, 2011, Multiple Sclerosis Journal 17(6):647-657 (Year: 2011).*
Behan et al., The sad plight of multiple sclerosis research (low on fact, high on fiction): critical data to support it being a neurocristopathy, 2010, Inflammopharmacol 18:265-290 (Year: 2010).*
Ransohoff, R. M., Animal models of multiple sclerosis: the good, the bad and the bottom line, Aug. 2012, Nature Neuroscience 15(8): 1074-1077 (Year: 2012).*
't Hart et al., Modelling of multiple sclerosis: lessons learned in a non-human primate, Oct. 2004, The Lancet Neurology 3:588-597 (Year: 2004).*
Wekerle et al., Animal models of multiple sclerosis, 2006, Drug Discovery Today: Disease Models Nervous system disorders 3(42):359-367 (Year: 2006).*
Lassmann et al. "Multiple sclerosis: experimental models and reality", Acta Neuropathol (2017) 133:223-244 (Year: 2017).*
Sriram et al. "Experimental Allergic Encephalomyelitis: A Misleading Model of Multiple Sclerosis", Ann Neurol 2005;58:939-945 (Year: 2005).*
Tsunoda et al., "Antibody association with a novel model for primary progressive multiple sclerosis: induction of relapsing-remitting and progressive forms of EAE in H2s mouse strains", Brain Pathol. Jul. 2000;10(3):402-18 (Year: 2000).*
Li et al. "Interferon-lambdas: the modulators of antivirus, antitumor, and immune responses", J Leukoc Biol. Jul. 2009; 86(1):23-32. (Year: 2009).*
Nejati et al. "EBV and vitamin D status in relapsing-remitting multiple sclerosis patients with a unique cytokine signature", Med Microbiol Immunol. Apr. 2016;205(2):143-54. (Year: 2016).*
Ank N. et al. (2008), An important role for type III interferon (IFN-lambda/IL-28) in TLR-induced antiviral activity, J Immunol., vol. 180, No. 4, pp. 2474-2485.
Auffray C. et al. (2007), Monitoring of blood vessels and tissues by a population of monocytes with patrolling behavior, Science, vol. 317, No. 5838, pp. 666-670.
Bettelli E., Dastrange M., and Oukka M. (2005), Foxp3 interacts with nuclear factor of activated T cells and NF-kappa B to repress cytokine gene expression and effector functions of T helper cells, Proc Natl Acad Sci U S A, vol. 102, No. 14, pp. 5138-5143.
Bruck W. et al. (1995), Monocyte/macrophage differentiation in early multiple sclerosis lesions, Ann Neurol., vol. 38, No. 5, pp. 788-796.
Codarri L. et al. (2011), RORgammat drives production of the cytokine GM-CSF in helper T cells, which is essential for the effector phase of autoimmune neuroinflammation, Nat Immunol., vol. 12, No. 6, pp. 560-567.
Compston A., Coles A. (2008), Multiple sclerosis, Lancet, vol. 372, No. 9648, pp. 1502-1517.
Cruz-Orengo L. et al. (2011), CXCR7 antagonism prevents axonal injury during experimental autoimmune encephalomyelitis as revealed by in vivo axial diffusivity, Journal of neuroinflammation, vol. 8, No. 170, pp. 1-14.
Dai J. et al. (2009), IFN-lambda1 (IL-29) inhibits GATA3 expression and suppresses Th2 responses in human naive and memory T cells, Blood, vol. 113, No. 23, pp. 5829-5838.
Ding S. et al. (2014), Epigenetic reprogramming of the type III interferon response potentiates antiviral activity and suppresses tumor growth, PLoS biology, vol. 12, No. 1, pp. e1001758.

(Continued)

Primary Examiner — Daniel E Kolker
Assistant Examiner — Peter Johansen

(57) ABSTRACT

Among the various aspects of the present disclosure is the provision of compositions and methods for treating autoimmune diseases (e.g., multiple sclerosis).

20 Claims, 16 Drawing Sheets

(56) References Cited

OTHER PUBLICATIONS

Edelson B.T. et al. (2011), Batf3-dependent CD11b(low/-) peripheral dendritic cells are GM-CSF-independent and are not required for Th cell priming after subcutaneous immunization, PLoS One, vol. 6, No. 10, pp. e25660.
Feinstein A., Freeman J., and Lo A.C (2015), Treatment of progressive multiple sclerosis: what works, what does not, and what is needed, The Lancet Neurology, vol. 14, No. 2, pp. 194-207.
Fyfe I. (2017), Multiple sclerosis: New imaging marker of brain leukocyte infiltration. Nature reviews, vol. 13, No. 1, pp. 4-5.
Goodin D.S. et al. (2002), Disease modifying therapies in multiple sclerosis: report of the Therapeutics and Technology Assessment Subcommittee of the American Academy of Neurology and the MS Council for Clinical Practice Guidelines, Neurology, vol. 58, No. 2, pp. 169-178.
Greter M. et al. (2005), Dendritic cells permit immune invasion of the CNS in an animal model of multiple sclerosis, Nat Med, vol. 11, No. 3, pp. 328-334.
Greter M., Lelios I., and Croxford A.L. (2015), Microglia Versus Myeloid Cell Nomenclature during Brain Inflammation, Front Immunol., vol. 6, No. 249, pp. 1-7.
Hurwitz B.J. (2009), The diagnosis of multiple sclerosis and the clinical subtypes, Annals of Indian Academy of Neurology, vol. 12, No. 4, pp. 226-230.
Jordan W.J. et al. (2007), Human interferon lambda-1 (IFN-lambda1/IL-29) modulates the Th1/Th2 response, Genes and immunity, vol. 8, No. 3, pp. 254-261.
Jordan W.J. et al. (2007), Modulation of the human cytokine response by interferon lambda-1 (IFN-lambda1/IL-29), Genes and immunity, vol. 8, No. 1, pp. 13-20.
Kermode A.G. et al. (1990), Breakdown of the blood-brain barrier precedes symptoms and other MRI signs of new lesions in multiple sclerosis. Pathogenetic and clinical implications, Brain, vol. 113, pp. 1477-1489.
Kieseier B.C. (2011), The mechanism of action of interferon-beta in relapsing multiple sclerosis, CNS Drugs, vol. 25, No. 6, pp. 491-502.
Klein R.S. et al. (2005), Neuronal CXCL10 directs CD8+ T-cell recruitment and control of West Nile virus encephalitis, Journal of virology, vol. 79, No. 17, pp. 11457-11466.
Koltsida O. et al (2011), IL-28A (IFN-lambda2) modulates lung DC function to promote Th1 immune skewing and suppress allergic airway disease, EMBO molecular medicine, vol. 3, No. 6, pp. 348-361.
Kotenko S.V. et al. (2003), IFN-lambdas mediate antiviral protection through a distinct class II cytokine receptor complex, Nature immunology, vol. 4, No. 1, pp. 69-77.
Lasfar A. et al. (2006), Characterization of the mouse IFN-lambda ligand-receptor system: IFN-lambdas exhibit antitumor activity against B16 melanoma, Cancer research, vol. 66, No. 8, pp. 4468-4477.
Lazear H.M., Nice T.J., and Diamond M.S. (2015), Interferon-lambda: Immune Functions at Barrier Surfaces and Beyond, Immunity, vol. 43, No. 1, pp. 15-28.
Lazear H.M. et al. (2015), Interferon-lambda restricts West Nile virus neuroinvasion by tightening the blood-brain barrier, Science translational medicine, vol. 7, No. 284, pp. 284ra59.
Lees J.R. et al. (2008), Regional CNS responses to IFN-gamma determine lesion localization patterns during EAE pathogenesis, The Journal of experimental medicine, vol. 205, No. 11, pp. 2633-2642.
Liu Y. et al. (2006), Neuron-mediated generation of regulatory T cells from encephalitogenic T cells suppresses EAE, Nat Med., vol. 12, No. 5, pp. 518-525.
Marzinak M., Meuth S. (2014), Current perspectives on interferon Beta-1b for the treatment of multiple sclerosis, Advances in therapy, vol. 31, No. 9, pp. 915-931.
Mccandless E.E. et al. (2006), CXCL12 limits inflammation by localizing mononuclear infiltrates to the perivascular space during experimental autoimmune encephalomyelitis, J Immunol., vol. 177, No. 11, pp. 8053-8064.
Minnechet F.J. and Uze G. (2006), Interferon-lambda-treated dendritic cells specifically induce proliferation of FOXP3-expressing suppressor T cells, Blood, vol. 107, No. 11, pp. 4417-4423.
Miller D.H., Leary S.M. (2007), Primary-progressive multiple sclerosis, The Lancet Neurology, vol. 6, No. 10, pp. 903-912.
Minagar A. et al. (2003), Interferon (IFN)-beta 1a and IFN-beta 1b block IFN-gamma-induced disintegration of endothelial junction integrity and barrier, Endothelium : journal of endothelial cell research, vol. 10, No. 6, pp. 299-307.
Misumi I. and Whitmire J.K. (2014), IFN-lambda exerts opposing effects on T cell responses depending on the chronicity of the virus infection, J Immunol., vol. 192, No. 8, pp. 3596-3606.
Morrow M.P. et al. (2010), Unique Th1/Th2 phenotypes induced during priming and memory phases by use of interleukin-12 (IL-12) or IL-28B vaccine adjuvants in rhesus macaques, Clinical and vaccine immunology : CVI., vol. 17, No. 10, pp. 1493-1499.
Nejati et al. (2016), EBV and vitamin D status in relapsing-remitting multiple sclerosis patients with a unique cytokine signature, Med Microbiol Immunol., vol. 205, No. 2, pp. 143-154.
Ponomarev E.D. et al. (2007), GM-CSF production by autoreactive T cells is required for the activation of microglial cells and the onset of experimental autoimmune encephalomyelitis, J Immunol., vol. 178, No. 1, pp. 39-48.
Purdy M.C., Antiviral Compound May Protect Brain from Pathogens, West Nile Virus Study Shows published on May 15, 2015 (4 pages).
Simpson J.E. et al. (1998), Expression of monocyte chemoattractant protein-1 and other beta-chemokines by resident glia and inflammatory cells in multiple sclerosis lesions, J Neuroimmunol, vol. 84, No. 2, pp. 238-249.
Sommereyns et al. (2008), IFN-Lambda (IFN-λ) is Expressed in a Tissue-Dependent Fashion and Primarily Acts on Epithelial Cells in Vivo, PLOS: Pathogens, vol. 4, No. 3, pp. e1000017.
Srinivas S. et al. (2008), Interferon-lambda1 (interleukin-29) preferentially down-regulates interleukin-13 over other T helper type 2 cytokine responses in vitro, Immunology, vol. 125, No. 4, pp. 492-502.
Trapp B.D. et al. (1998), Axonal transection in the lesions of multiple sclerosis, N Engl J Med. vol. 338, No. 5, pp. 278-285.
Vainchtein I.D., et al. (2014), In acute experimental autoimmune encephalomyelitis, infiltrating macrophages are immune activated, whereas microglia remain immune suppressed, Glia, vol. 62, No. 10, pp. 1724-1735.
Van Der Voorn P. et al. (1999), Expression of MCP-1 by reactive astrocytes in demyelinating multiple sclerosis lesions, Am J Pathol., vol. 154, No. 1, pp. 45-51.
Williams J.L. et al. (2014), Targeting CXCR7/ACKR3 as a therapeutic strategy to promote remyelination in the adult central nervous system, The Journal of experimental medicine, vol. 211, No. 5, pp. 791-799.
Windhagen A. et al. (1995), Expression of costimulatory molecules B7-1 (CD80), B7-2 (CD86), and interleukin 12 cytokine in multiple sclerosis lesions, J Exp Med., vol. 182, No. 6, pp. 1985-1996.
Wingerchuk D.M., Carter J.L. (2014), Multiple sclerosis: current and emerging disease-modifying therapies and treatment strategies, Mayo Clinic proceedings, vol. 89, No. 2, pp. 225-240.
Wolk K. et al. (2013), IL-29 is produced by T(H)17 cells and mediates the cutaneous antiviral competence in psoriasis, Science translational medicine, vol. 5, No. 204, pp. 204ra129.
Yong V.W. et al. (1998), Interferon beta in the treatment of multiple sclerosis: mechanisms of action, Neurology, vol. 51, No. 3, pp. 682-689.
Zhang J. et al. (1994), Increased frequency of interleukin 2-responsive T cells specific for myelin basic protein and proteolipid protein in peripheral blood and cerebrospinal fluid of patients with multiple sclerosis, J Exp Med., vol. 179, No. 3, pp. 973-984.
Zivadinov R., Bakshi R. (2004), Role of MRI in multiple sclerosis I: inflammation and lesions. Frontiers in bioscience, vol. 9, pp. 665-683.

(56) References Cited

OTHER PUBLICATIONS

Zurawski J., Lassmann H., Bakshi R. (2017), Use of Magnetic Resonance Imaging to Visualize Leptomeningeal Inflammation in Patients With Multiple Sclerosis: A Review, JAMA neurology, vol. 74, No. 1, pp. 100-109.

Cris S Constantinescu, Nasr Farooqi, Kate O'Brien and Bruno Gran, Experimental autoimmune encephalomyelitis (EAE) as a model for multiple sclerosis (MS), British Journal of Pharmacology (2011) 164 1079-1106.

Jennifer Phelan, Generating EAE Mouse Models of Multiple Sclerosis, Taconic Biosciences, Dec. 19, 2016 (6 pages).

\* cited by examiner

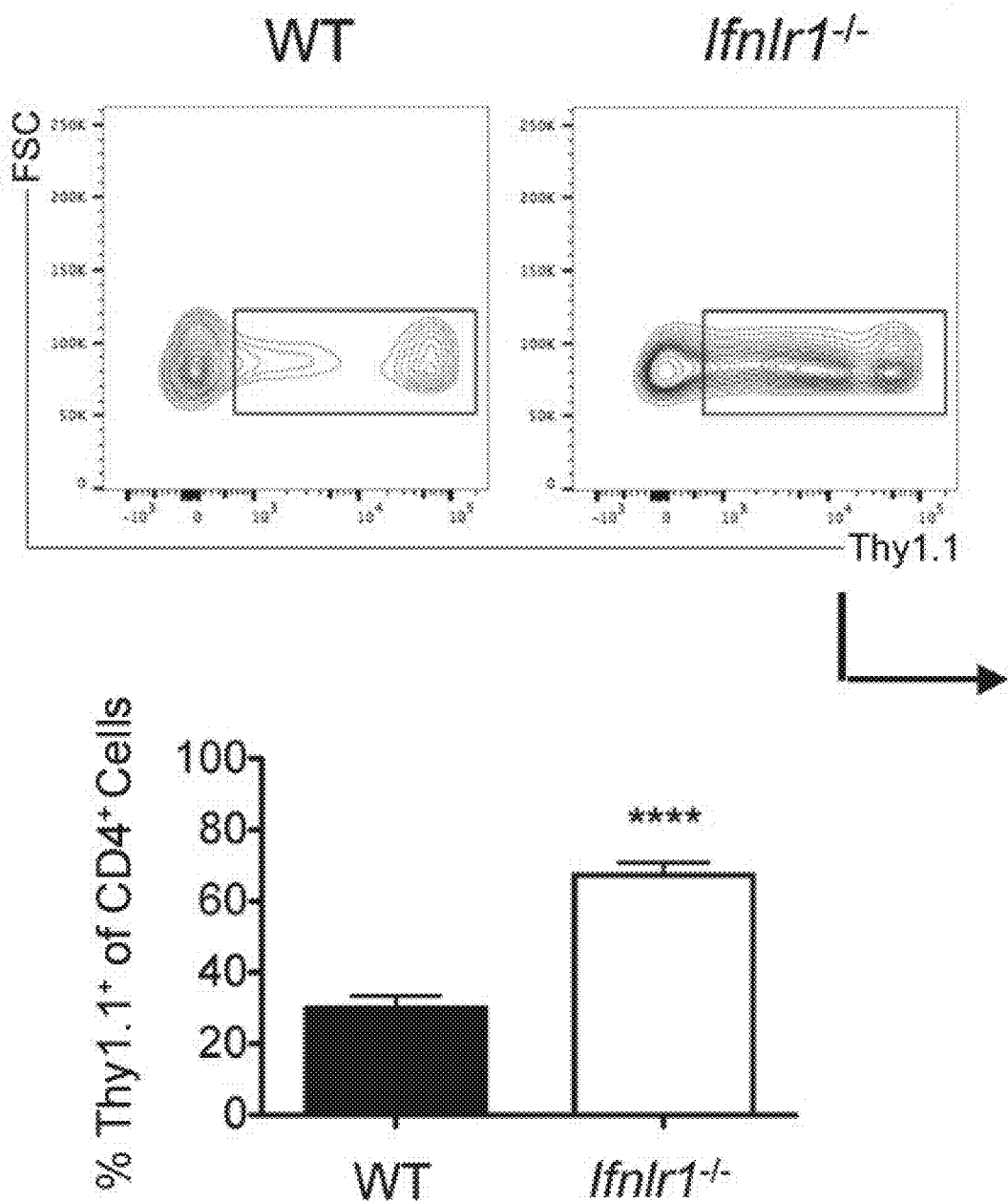

COMPOSITIONS AND METHODS FOR TREATMENT OF CENTRAL NERVOUS SYSTEM (CNS) AUTOIMMUNE ASSOCIATED DISEASES OR DISORDERS

CROSS-REFERENCE TO RELATED APPLICATIONS

This application claims priority from U.S. Provisional Application Ser. No. 62/617,523 filed on 15 Jan. 2018, which is incorporated herein by reference in its entirety.

STATEMENT REGARDING FEDERALLY SPONSORED RESEARCH OR DEVELOPMENT

Not applicable.

MATERIAL INCORPORATED-BY-REFERENCE

Not applicable.

FIELD OF THE INVENTION

The present disclosure generally relates to compositions for and methods of decreasing CNS inflammation.

SUMMARY OF THE INVENTION

Among the various aspects of the present disclosure is the provision of compositions and methods of treating autoimmune diseases (e.g., multiple sclerosis).

An aspect of the present disclosure provides for a method of protecting neurons in a subject. For example, the method can comprise administering a therapeutically effective amount of an IFNλ inhibiting agent to a subject in need thereof.

In some embodiments, neuronal protection comprises the prevention of nerve damage or decreasing central nervous system (CNS) autoimmune inflammation.

In some embodiments, the subject has a central nervous system (CNS) autoimmune disease, disorder, or condition.

In some embodiments, the CNS autoimmune disease, disorder, or condition is multiple sclerosis (MS).

In some embodiments, the CNS autoimmune disease, disorder, or condition is selected from the group consisting of relapsing-remitting MS (RRMS), secondary progressive MS (SPMS), primary-progressive MS (PPMS), or progressive-relapsing MS (PRMS).

In some embodiments, a therapeutically effective amount of an IFNλ inhibiting agent results in neuronal protection; reduction or prevention of nerve damage; reduction or prevention of CNS autoimmune inflammation; or amelioration of the clinical severity of autoimmune encephalomyelitis, wherein the amelioration of the clinical severity of autoimmune encephalomyelitis includes amelioration of inflammation, demyelination, axonal loss, or gliosis.

In some embodiments, the IFNλ inhibiting agent is selected from one or more of the group consisting of: a neutralizing antibody, an anti-IFNλ antibody, an anti-IFNLR1 antibody, an interferon lambda (IL-28b) neutralizing antibody, or anti-IL28b/IFN-A3, an IFNLR1-Fc fusion protein.

In some embodiments, the IFNλ inhibiting agent comprises a small molecule IFNλ inhibitor, IFNλ SIRNA, IFNλ sgRNA, IFNλ shRNA, zinc, or a viral protein antagonist of IFNλ.

In some embodiments, the IFNλ inhibiting agent comprises a small molecule IFNLR1 inhibitor, IFNLR1 siRNA, IFNLR1 sgRNA, IFNLR1 shRNA, zinc, or a viral protein antagonist of IFNLR1.

Another aspect of the present disclosure provides for a method of treating a central nervous system (CNS) autoimmune disease, disorder, or condition in a subject, comprising administering a therapeutically effective amount of an IFNλ inhibiting agent to a subject in need thereof.

In some embodiments, the CNS autoimmune disease, disorder, or condition is multiple sclerosis; the IFNλ inhibiting agent is anti-IL28b/IFN-A3; and the anti-IL28b/IFN-A3 reduces or prevents CNS autoimmune inflammation or nerve damage.

Yet another aspect of the present disclosure provides for a pharmaceutical composition comprising an IFNλ inhibiting agent, wherein IFNλ inhibiting agent reduces or prevents CNS autoimmune inflammation or nerve damage.

In some embodiments, the IFNλ inhibiting agent is an anti-IFNλ antibody.

In some embodiments, the IFNλ inhibiting agent is an anti-IFNLR1 antibody.

In some embodiments, the IFNλ inhibiting agent is an IFNLR1-Fc fusion protein.

In some embodiments, the IFNλ inhibiting agent comprises a small molecule IFNλ inhibitor, IFNλ siRNA, IFNλ sgRNA, IFNλ shRNA, zinc, or a viral protein antagonist of IFNλ.

In some embodiments, the IFNλ inhibiting agent comprises a small molecule IFNLR1 inhibitor, IFNLR1 SIRNA, IFNLR1 sgRNA, IFNLR1 shRNA, zinc, or a viral protein antagonist of IFNLR1.

Yet another aspect of the present disclosure provides for a method of generating antibodies against IFNMIFNLR1. In some embodiments, the method comprises: (a) immunizing a subject (e.g., a mammal) with IFNλ/IFNLR1 protein or analog; and (b) isolating IFN//IFNLR1-specific antibodies.

Yet another aspect of the present disclosure provides for a method of screening for an IFNλ/IFNLR1 inhibitor comprising: (a) contacting IFNλ/IFNLR1 with a test compound; and (b) measuring IFNMIFNLR1 binding to IFNLR1/IFNλ; and (c) optionally determining whether the test compound is an IFNMIFNLR1 inhibitor from the measurements taken in step (b).

Yet another aspect of the present disclosure provides for a method of detecting IFN-$\lambda$3, wherein increased levels of IFN-A3 indicate progressive MS, when compared to levels of IFN-A3 in a control subject, levels of IFN-A3 in a control sample, or previous levels of IFN-3 in a subject having MS.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 1A-FIG. 1E is a series of graphs and images showing that IFNλ signaling maintains autoimmune encephalomyelitis and effector T cell function. Activated Thy1.1$^+$, MOG-specific Th1 clones were injected into naïve WT or Ifnlr1$^{-/-}$ mice. FIG. 1A is a set of line graphs showing the clinical course and weight loss of recipient mice. Data shown for WT (n=10) and Ifnlr1$^{-/-}$ (n=11) mice are representative of 4 independent experiments. FIG. 1B shows IHC analysis of lesions within the ventral lumbar spinal cord of WT and Ifnlr1$^{-/-}$ mice during EAE at the time points indicated in FIG. 1A. Lesion area was delineated using CD3 and Iba-1 staining and SMI-32$^+$ area was quantified as bar graphs with comparisons between genotype. Data are representative of 2 independent experiments with 5 to 8 WT or Ifnlr1/mice per time point per replicate. FIG. 1C is a set of bar graphs showing the expression of Ifnlr1 and Ifnl3 as quantified by qRT-PCR. Transcripts that were below the limit of detection are indicated by a dashed line or not detected (ND). Data were collected from 5 to 6 WT or Ifnlr1$^{-/-}$ mice per time point. FIG. 1D is a set of flow cytometry plots showing that CD4$^+$ cells were identified from a live, single cell gate, and the proportion of donor Thy1.1$^+$ cells is quantified in a bar graph, below. Of the Thy1.1$^+$CD4$^+$ cells shown in FIG. 1D, FIG. 1E shows flow cytometry plots of GM-CSF$^+$ and IFNγ$^+$ cells and IL-10$^+$ and FoxP3$^+$ cells, which are quantified in bar graph, below. Data are representative of 2 independent experiments with 4 to 5 WT or Ifnlr1/mice per replicate. Data are presented as means±SEM. Scale bar=20 µm. *, P<0.05; , P<0.01; **, P<0.0001 by Mann-Whitney U test (FIG. 1A), 2-way ANOVA (FIG. 1B-FIG. 1C), or 2-tailed Student's t test (FIG. 1D-FIG. 1E).

FIG. 2A is a set of dot plots showing the day of clinical onset of EAE and the maximum score observed for each mouse. FIG. 2B shows confocal IHC analysis of lesions within the ventral lumbar spinal cord of WT and Ifnlr1$^{-/-}$ mice during EAE at peak and recovery timepoints as indicated in FIG. 1A. MOG+ and damaged MBP (myelin basic protein69-86, dMBP)$^+$ area was quantified by setting thresholds based on isotype controls with comparisons between genotype, as shown in bar graphs, below.

FIG. 3A is a set of flow cytometry plots analyzing the expression of GM-CSF and IFNγ in MOG-specific WT and Ifnlr1$^{-/-}$ CD4$^+$Th1 clones. FIG. 3B is a line graph showing the EAE clinical course of naïve WT recipients following retroorbital injection of 10$^7$ cells WT or Ifnlr1$^{-/-}$ activated cells from FIG. 3A.

FIG. 4A is a set of flow cytometry plots showing how live, single cells were gated and populations P1-P4 were identified based on level of CD11b and CD45 coexpression. FIG. 4B is a set of bar graphs showing the proportion and total cell number that was quantified for each population. FIG. 4C is a set of bar graphs showing the IFNγ-expressing cells of each population. FIG. 4D is a set of bar graphs showing the IL-10-expressing cells of each population. FIG. 4E is a series of bar graphs quantifying the MHCII-expressing and CD80-expressing cells from P1-P4. FIG. 4F shows representative histograms of FIG. 4E. Data are representative of 2 independent experiments with n=4-5 per group and presented as means ±SEM. *, P<0.05; , P<0.01; *, P<0.001; ****, P<0.0001 by 2-way ANOVA.

FIG. 5A is a bar graph showing the flow cytometric analysis of leukocyte populations from a live, single cell gate. FIG. 5B is a series of flow cytometry plots showing that CD11b$^+$ monocytes were then identified by gating on CD14 and further, Ly6-C. The proportion of Ly6 C$^-$ and Ly6 C$^+$ monocytes are expressed as means±SEM, as shown in the bar graphs, below. *, P<0.05.

FIG. 6A is a bar graph showing the analysis of CD4$^+$ cells for intracellular cytokine expression. FIG. 6B is a set of flow cytometry plots showing that Ly6-C expression was analyzed for CD11b-CD14$^+$, CD11b$^+$CD14$^+$ and CD11b$^+$CD14 subsets of myeloid cells, quantified in the bar graph, below. FIG. 6C is a series of bar graphs showing the analysis for intracellular cytokines (IFNγ, GMCSF, IL-4, IL-10) and CD80 expression of cells that were Ly6-C$^-$ and Ly6-C$^+$ among CD11b-CD14$^+$, CD11b$^+$CD14$^+$ and CD11b$^+$CD14-subsets of myeloid cells.

FIG. 7A is a series of images of postmortem tissue specimens that were collected from non-MS controls (NMS, n=3), and FIG. 7B is a series of images of tissue specimens that were collected from patients diagnosed with RRMS (n=5 lesions from n=3 patients) or SPMS (n=4 lesions from n=3 patients). In FIG. 7A-FIG. 7B, endothelial cell localization of IFNλ in NAWM and in lesions was visualized using IHC. Nuclei were counterstained with DAPI. Scale bar, 20 µm. FIG. 7C is a dot plot using the Mander's Coefficient (M1) for colocalization (ImageJ) to quantify vessel-associated IFNλ. M1 values within lesions were normalized to NAWM values of the same patient sample. *, P <0.05 by one-way ANOVA using multiple comparisons. FIG. 7D is a set of line graphs showing the clinical scores and weight loss of naïve WT recipients that were injected with WT Th1 cells. On day 14 post-transfer, neutralizing monoclonal mouse anti-IL-28b (n=7) or an IgG1 control (n=6) was administered. Data represent pooled values from 2 independent experiments. ***, P<0.001 by Mann-Whitney U test for clinical scores and by 2-tailed Student's t test for weight data.

DETAILED DESCRIPTION OF THE INVENTION

Figure 1A:
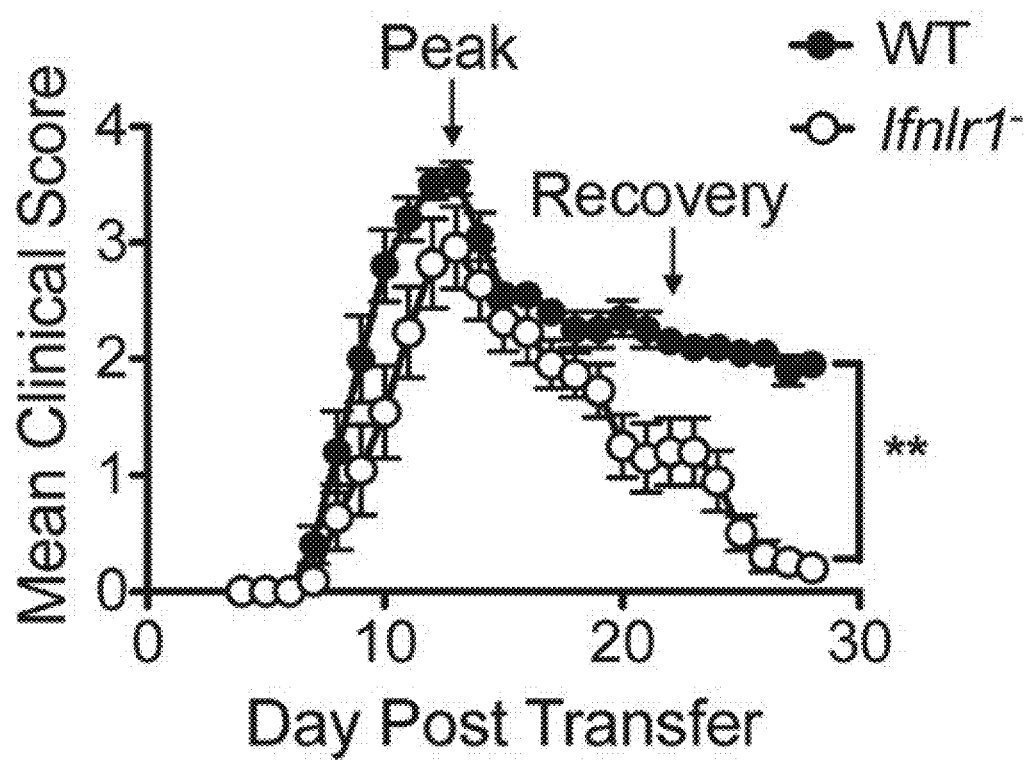
Figure 1A:
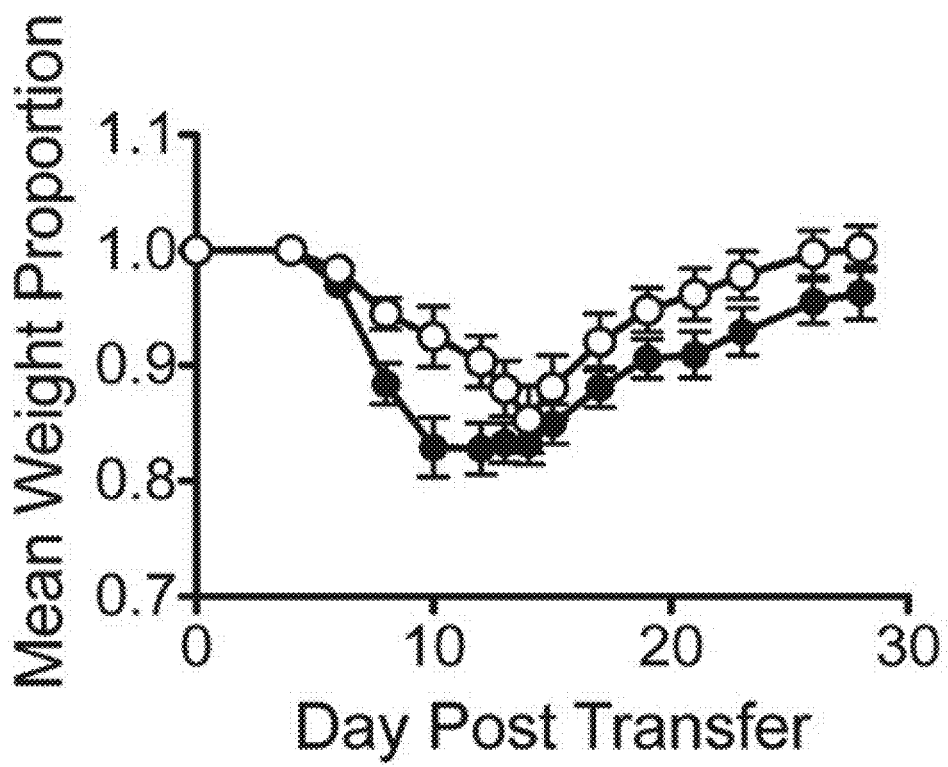

The present disclosure is based, at least in part, on the discovery that neutralization of interferon lambda can be used for the treatment of central nervous system (CNS) autoimmune inflammation. As described herein, a novel drug target, interferon lambda, was identified for the treatment of CNS autoimmunity (e.g., multiple sclerosis). As shown herein, the use of interferon lambda targeting during CNS autoimmunity can be used to treat patients with multiple sclerosis (e.g., those with chronic, progressive disease). For example, the use of anti-IL28b/IFN-A3 was shown to neutralize cell signaling molecule IFN-λ3 as a new treatment for CNS autoimmune inflammation including in subjects with multiple sclerosis (MS). As described herein, using a murine model of MS, experimental autoimmune encephalomyelitis (EAE), a single dose application of interferon lambda (IL-28b) neutralizing antibody given during ongoing disease ameliorated the clinical severity of EAE. It is well understood that experimental autoimmune encephalomyelitis (EAE) is a commonly used experimental model for a human inflammatory demyelinating disease, such as multiple sclerosis (MS). Further, it was shown herein that compared to non-neurological disease controls, patients with a progressive form of MS had increased expression of interferon lambda within lesioned CNS tissues. As such, the described compositions and methods can prevent the progression of MS or treat progressive MS.

The present disclosure (see e.g., Example 1) describes interferon lambda (INF-λ) as a suitable target for the treatment of CNS autoimmunity disorders or diseases including multiple sclerosis (MS). As described herein, loss of INF-λ signaling by deleting IFNLR1, the receptor for INF-λ1-3 (also known as IL28b) in an animal model of experimental autoimmune encephalomyelitis (EAE) resulted in the recovery from EAE with axonal sparing. It was shown that INF-λ signaling was not essential for the development of inflammation but was essential for myeloid activation, maintenance, and progression of neuroinflammation.

Furthermore, it was shown that administration of INF-λ neutralizing antibody (e.g., anti-IL28b/INF-λ3) to mice resulted in recovery from EAE in mice. Moreover, it was shown that there was an increase in endothelial INF-λ in secondary progressive MS (SPMS) patients compared to relapsing-remitting MS (RRMS) patients. As such, neutralization of INF-λ can be used as a method of treatment of CNS autoimmune inflammation (e.g., chronic progressive MS).

Autoimmune Central Nervous System (CNS) Associated Disease, Disorder, or Condition One aspect of the present disclosure provides methods of treating an autoimmune CNS disease, disorder, or condition based on the discovery that IFNλ is essential for myeloid activation, maintenance and progression of neuroinflammation in a mouse model of MS.

As described herein, an autoimmune CNS disease, disorder, or condition can comprise any disease, disorder, or condition that results in CNS damage mediated by the immune system. For example, CNS demyelinating autoimmune diseases can be autoimmune diseases which primarily affect the central nervous system. For example, a CNS demyelinating autoimmune disease can be a diffuse cerebral sclerosis of Schilder, acute disseminated encephalomyelitis, acute hemorrhagic leukoencephalitis, multiple sclerosis, transverse myelitis, or neuromyelitis optica.

Multiple sclerosis (MS) is known to be an inflammatory disease of the central nervous system (CNS) characterized by loss of blood-brain barrier (BBB) integrity, infiltration of activated leukocytes and a Th1-mediated attack on the myelin sheath, leading to axonal damage. Autoimmune CNS inflammation and the development of MS and its animal model, experimental autoimmune encephalomyelitis (EAE), rely on reactivation of primed myelin-specific T cells by localized APCs, including macrophages/dendritic cells.

Multiple sclerosis can be relapsing-remitting MS (RRMS), secondary progressive MS (SPMS), primary-progressive MS (PPMS), or progressive-relapsing MS (PRMS). Most patients present with relapsing-remitting MS (RRMS), in which disease begins with episodes of neurological dysfunction followed by partial or complete remission, and later progresses to secondary progressive MS (SPMS) with fewer remissions and increasing clinical deterioration. RRMS is thought of as an immune-mediated subtype of MS, while SPMS likely represents neurodegenerative processes. Thus, it is not surprising that the approved immunomodulatory therapies have demonstrated efficacy for RRMS and are ineffective in patients with SPMS. It is critical to identify a molecular biomarker or therapeutic target in the progression of MS.

Type III Interferons

As described herein, the use of interferon lambda targeting during CNS autoimmunity can be used to treat patients with a CNS disease, disorder, or condition (e.g., multiple sclerosis, specifically those with chronic, progressive disease). The recently classified type III interferon group consists of three IFNλ (lambda) molecules called IFNλ1, IFNλ2, and IFNλ3 (also called IL29, IL28A, and IL28B respectively). These IFNs signal through a receptor complex consisting of IL 10R2 (also called CRF2-4) and IL28RA (also called IFNLR1, CRF2-12). Recently, a new protein with a similar function related to IFNλ3 was found around the same genomic locus and was designated IFNλ4. Its intracellular signaling is through IFNLR1 and therefore thought to be a type III interferon. Use of the term IFNλ can denote any of IFNλ1, IFNλ2, IFNλ3, and IFN\4; any combination of IFNλ1, IFNλ2, IFNλ3, or IFNλ4; or all of IFNλ1, IFNλ2, IFNλ3, and IFNλ4.

IFNλ can exhibit antiviral properties resembling that of type I IFNs (IFNα and IFNβ). IFNλ is widely used as a first-line drug in patients with MS, and there is evidence to suggest that it increases anti-inflammatory cytokine release, reduces the trafficking of inflammatory cells into the CNS and increases the integrity of BBB endothelial tight junctions. While IFNλ is also known to impact BBB function, it also down-regulates Th2 cytokines and promotes Th1-driven immunity and long-lasting Th1 memory responses. With variable overlap in function with type I IFNs, further investigation is needed to understand the role of IFNλ in models of Th1-dependent CNS inflammation that rely on sustained memory responses for maintenance of pathology.

Interferon Lambda (IFNλ) Inhibiting Agent

One aspect of the present disclosure provides for targeting of IFNλ, its receptor, or its downstream signaling. The present disclosure provides methods of treating autoimmune CNS disorders based on the discovery that IFNλ is essential for myeloid activation, maintenance and progression of neuroinflammation.

As described herein, inhibitors of IFNλ (e.g., antibodies, fusion proteins, small molecules) can reduce or prevent CNS autoimmune inflammation or nerve damage. An IFNλ inhibiting agent can be any agent that can inhibit IFNλ, downregulate IFNλ, or knockdown IFNλ.

As an example, an IFNλ inhibiting agent can inhibit IFN-λ signaling. For example, the IFNλ inhibiting agent can be an anti-IFNλ antibody. As an example, the anti-IFNλ antibody can be anti-IFNλ1 antibody, an anti-IFNλ2 antibody, an anti-IFNλ3 antibody, an anti-IFNλ4 antibody, or an anti-IFNλ antibody with activity against any combination of IFNλ1, IFNλ2, IFNλ3, or IFNλ4. Furthermore, the anti-IFNλ antibody can be a murine antibody, a humanized murine antibody, or a human antibody.

As another example, the IFNλ inhibiting agent can be an anti-IFNLR1 antibody, wherein the anti-IFNLR1 antibody prevents binding of IFNλ to its receptor, IFNLR1, or prevents activation of IFNLR1 and downstream signaling.

As another example, the IFNλ inhibiting agent can be a fusion protein. For example, the fusion protein can be a decoy receptor for IFNλ. Furthermore, the fusion protein can comprise a mouse or human Fc antibody domain fused to the ectodomain of IFNLR1.

As another example, an IFNλ inhibiting agent can be zinc, which has been shown to be a potent and specific inhibitor of IFN-λ3 signaling.

As another example, an IFNλ inhibiting agent can be an inhibitory protein that antagonizes IFNλ. For example, the IFNλ inhibiting agent can be a viral protein, which has been shown to antagonize IFNλ.

As another example, an IFNλ inhibiting agent can be a short hairpin RNA (shRNA) or a short interfering RNA (siRNA) targeting IFNλ or IFNLR1.

As another example, an IFNλ inhibiting agent can be an sgRNA targeting IFNλ or IFNLR1.

Methods for preparing a IFNλ inhibiting agent (e.g., an agent capable of inhibiting IFN-A signaling) can comprise construction of a protein/Ab scaffold containing the natural IFN-A3 receptor as an IFN-λ3 neutralizing agent; developing inhibitors of the IFN-λ3 receptor "down-stream"; or developing inhibitors of the IFN-A3 production "up-stream".

Molecular Engineering

The following definitions and methods are provided to better define the present invention and to guide those of ordinary skill in the art in the practice of the present invention. Unless otherwise noted, terms are to be understood according to conventional usage by those of ordinary skill in the relevant art.

The terms "heterologous DNA sequence", "exogenous DNA segment" or "heterologous nucleic acid," as used herein, each refer to a sequence that originates from a source foreign to the particular host cell or, if from the same source, is modified from its original form. Thus, a heterologous gene in a host cell includes a gene that is endogenous to the particular host cell but has been modified through, for example, the use of DNA shuffling. The terms also include non-naturally occurring multiple copies of a naturally occurring DNA sequence. Thus, the terms refer to a DNA segment that is foreign or heterologous to the cell, or homologous to the cell but in a position within the host cell nucleic acid in which the element is not ordinarily found. Exogenous DNA segments are expressed to yield exogenous polypeptides. A "homologous" DNA sequence is a DNA sequence that is naturally associated with a host cell into which it is introduced.

Expression vector, expression construct, plasmid, or recombinant DNA construct is generally understood to refer to a nucleic acid that has been generated via human intervention, including by recombinant means or direct chemical synthesis, with a series of specified nucleic acid elements that permit transcription or translation of a particular nucleic acid in, for example, a host cell. The expression vector can be part of a plasmid, virus, or nucleic acid fragment. Typically, the expression vector can include a nucleic acid to be transcribed operably linked to a promoter.

A "promoter" is generally understood as a nucleic acid control sequence that directs transcription of a nucleic acid. An inducible promoter is generally understood as a promoter that mediates transcription of an operably linked gene in response to a particular stimulus. A promoter can include necessary nucleic acid sequences near the start site of transcription, such as, in the case of a polymerase II type promoter, a TATA element. A promoter can optionally include distal enhancer or repressor elements, which can be located as much as several thousand base pairs from the start site of transcription.

A "transcribable nucleic acid molecule" as used herein refers to any nucleic acid molecule capable of being transcribed into a RNA molecule. Methods are known for introducing constructs into a cell in such a manner that the transcribable nucleic acid molecule is transcribed into a functional mRNA molecule that is translated and therefore expressed as a protein product. Constructs may also be constructed to be capable of expressing antisense RNA molecules, in order to inhibit translation of a specific RNA molecule of interest. For the practice of the present disclosure, conventional compositions and methods for preparing and using constructs and host cells are well known to one skilled in the art (see e.g., Sambrook and Russel (2006) Condensed Protocols from Molecular Cloning: A Laboratory Manual, Cold Spring Harbor Laboratory Press, ISBN-10:0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10:0879695773; Elhai, J. and Wolk, C. P. 1988. Methods in Enzymology 167, 747-754).

The "transcription start site" or "initiation site" is the position surrounding the first nucleotide that is part of the transcribed sequence, which is also defined as position +1. With respect to this site all other sequences of the gene and its controlling regions can be numbered. Downstream sequences (i.e., further protein encoding sequences in the 3' direction) can be denominated positive, while upstream sequences (mostly of the controlling regions in the 5' direction) are denominated negative.

"Operably-linked" or "functionally linked" refers preferably to the association of nucleic acid sequences on a single nucleic acid fragment so that the function of one is affected by the other. For example, a regulatory DNA sequence is said to be "operably linked to" or "associated with" a DNA sequence that codes for an RNA or a polypeptide if the two sequences are situated such that the regulatory DNA sequence affects expression of the coding DNA sequence (i.e., that the coding sequence or functional RNA is under the transcriptional control of the promoter). Coding sequences can be operably-linked to regulatory sequences in sense or antisense orientation. The two nucleic acid molecules may be part of a single contiguous nucleic acid molecule and may be adjacent. For example, a promoter is operably linked to a gene of interest if the promoter regulates or mediates transcription of the gene of interest in a cell.

A "construct" is generally understood as any recombinant nucleic acid molecule such as a plasmid, cosmid, virus, autonomously replicating nucleic acid molecule, phage, or linear or circular single-stranded or double-stranded DNA or RNA nucleic acid molecule, derived from any source, capable of genomic integration or autonomous replication, comprising a nucleic acid molecule where one or more nucleic acid molecule has been operably linked.

A constructs of the present disclosure can contain a promoter operably linked to a transcribable nucleic acid molecule operably linked to a 3° transcription termination nucleic acid molecule. In addition, constructs can include but are not limited to additional regulatory nucleic acid molecules from, e.g., the 3'-untranslated region (3' UTR). Constructs can include but are not limited to the 5' untranslated regions (5' UTR) of an mRNA nucleic acid molecule which can play an important role in translation initiation and can also be a genetic component in an expression construct. These additional upstream and downstream regulatory nucleic acid molecules may be derived from a source that is native or heterologous with respect to the other elements present on the promoter construct.

The term "transformation" refers to the transfer of a nucleic acid fragment into the genome of a host cell, resulting in genetically stable inheritance. Host cells containing the transformed nucleic acid fragments are referred to as "transgenic" cells, and organisms comprising transgenic cells are referred to as "transgenic organisms".

"Transformed," "transgenic," and "recombinant" refer to a host cell or organism such as a bacterium, cyanobacterium, animal or a plant into which a heterologous nucleic acid molecule has been introduced. The nucleic acid molecule can be stably integrated into the genome as generally known in the art and disclosed (Sambrook 1989; Innis 1995; Gelfand 1995; Innis & Gelfand 1999). Known methods of PCR include, but are not limited to, methods using paired primers, nested primers, single specific primers, degenerate primers, gene-specific primers, vector-specific primers, partially mismatched primers, and the like. The term "untransformed" refers to normal cells that have not been through the transformation process.

"Wild-type" refers to a virus or organism found in nature without any known mutation.

Design, generation, and testing of the variant nucleotides, and their encoded polypeptides, having the above required percent identities and retaining a required activity of the expressed protein is within the skill of the art. For example, directed evolution and rapid isolation of mutants can be according to methods described in references including, but not limited to, Link et al. (2007) Nature Reviews 5 (9), 680-688; Sanger et al. (1991) Gene 97 (1), 119-123; Ghadessy et al. (2001) Proc Natl Acad Sci USA 98 (8) 4552-4557. Thus, one skilled in the art could generate a large number of nucleotide and/or polypeptide variants having, for example, at least 95-99% identity to the reference sequence described herein and screen such for desired phenotypes according to methods routine in the art.

Nucleotide and/or amino acid sequence identity percent (%) is understood as the percentage of nucleotide or amino acid residues that are identical with nucleotide or amino acid residues in a candidate sequence in comparison to a reference sequence when the two sequences are aligned. To determine percent identity, sequences are aligned and if necessary, gaps are introduced to achieve the maximum percent sequence identity. Sequence alignment procedures to determine percent identity are well known to those of skill in the art. Often publicly available computer software such as BLAST, BLAST2, ALIGN2 or Megalign (DNASTAR) software is used to align sequences. Those skilled in the art can determine appropriate parameters for measuring alignment, including any algorithms needed to achieve maximal alignment over the full-length of the sequences being compared. When sequences are aligned, the percent sequence identity of a given sequence A to, with, or against a given sequence B (which can alternatively be phrased as a given sequence A that has or comprises a certain percent sequence identity to, with, or against a given sequence B) can be calculated as: percent sequence identity=X/Y100, where X is the number of residues scored as identical matches by the sequence alignment program's or algorithm's alignment of A and B and Y is the total number of residues in B. If the length of sequence A is not equal to the length of sequence B, the percent sequence identity of A to B will not equal the percent sequence identity of B to A.

Generally, conservative substitutions can be made at any position so long as the required activity is retained. So-called conservative exchanges can be carried out in which the amino acid which is replaced has a similar property as the original amino acid, for example the exchange of Glu by Asp, Gin by Asn, Val by Ile, Leu by Ile, and Ser by Thr. For example, amino acids with similar properties can be Aliphatic amino acids (e.g., Glycine, Alanine, Valine, Leucine, Isoleucine); Hydroxyl or sulfur/selenium-containing amino acids (e.g., Serine, Cysteine, Selenocysteine, Threonine, Methionine); Cyclic amino acids (e.g., Proline); Aromatic amino acids (e.g., Phenylalanine, Tyrosine, Tryptophan); Basic amino acids (e.g., Histidine, Lysine, Arginine); or Acidic and their Amide (e.g., Aspartate, Glutamate, Asparagine, Glutamine). Deletion is the replacement of an amino acid by a direct bond. Positions for deletions include the termini of a polypeptide and linkages between individual protein domains. Insertions are introductions of amino acids into the polypeptide chain, a direct bond formally being replaced by one or more amino acids. Amino acid sequence can be modulated with the help of art-known computer simulation programs that can produce a polypeptide with, for example, improved activity or altered regulation. On the basis of this artificially generated polypeptide sequences, a corresponding nucleic acid molecule coding for such a modulated polypeptide can be synthesized in-vitro using the specific codon-usage of the desired host cell.

"Highly stringent hybridization conditions" are defined as hybridization at 65° C. in a 6×SSC buffer (i.e., 0.9 M sodium chloride and 0.09 M sodium citrate). Given these conditions, a determination can be made as to whether a given set of sequences will hybridize by calculating the melting temperature ($T_m$) of a DNA duplex between the two sequences. If a particular duplex has a melting temperature lower than 65° C. in the salt conditions of a 6×SSC, then the two sequences will not hybridize. On the other hand, if the melting temperature is above 65° C. in the same salt conditions, then the sequences will hybridize. In general, the melting temperature for any hybridized DNA: DNA sequence can be determined using the following formula: $T_m$=81.5° C. +16.6 (log$_{10}$ [Na$^+$])+0.41 (fraction G/C content)-0.63 (% formamide)-(600/1). Furthermore, the $T_m$ of a DNA: DNA hybrid is decreased by 1-1.5° C. for every 1% decrease in nucleotide identity (see e.g., Sambrook and Russel, 2006).

Host cells can be transformed using a variety of standard techniques known to the art (see, e.g., Sambrook and Russel (2006) Condensed Protocols from Molecular Cloning: A Laboratory Manual, Cold Spring Harbor Laboratory Press, ISBN-10:0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10:0879695773; Elhai, J. and Wolk, C. P. 1988. Methods in Enzymology 167, 747-754). Such techniques include, but are not limited to, viral infection, calcium phosphate transfection, liposome-mediated transfection, microprojectile-mediated delivery, receptor-mediated uptake, cell fusion, electroporation, and the like. The transfected cells can be selected and propagated to provide recombinant host cells that comprise the expression vector stably integrated in the host cell genome.

TABLE 2

Conservative Substitutions I

| SIDE CHAIN CHARACTERISTIC | AMINO ACID |
| --- | --- |

TABLE 2-continued

| | |
|---|---|
| Non-polar | G A P I L Y |
| Polar-uncharged | C S T M N Q |
| Polar-charged | D E K R |
| Aromatic | H F W Y |
| Other | N Q D E |

Conservative Substitutions II

| SIDE CHAIN CHARACTERISTIC | AMINO ACID |
|---|---|
| Non-polar (hydrophobic) | |
| A. Aliphatic: | A L I V P |
| B. Aromatic: | F W |
| C. Sulfur-containing: | M |
| D. Borderline: | G |
| Uncharged-polar | |
| A. Hydroxyl: | S T Y |
| B. Amides: | N Q |
| C. Sulfuydryl: | C |
| D. Borderline: | G |
| Positively Charged (Basic): | K R H |
| Negatively Charged (Acidic): | D E |

Conservative Substitutions III

| Original Residue | Exemplary Substitution |
|---|---|
| Ala (A) | Val (V), Leu (L), Ile (I) |
| Arg (R) | Lys (K), Gln (Q), Asn (N) |
| Asn (N) | Gln (Q), His (H), Lys (K), Arg (R) |
| Asp (D) | Glu (E) |
| Cys (C) | Ser (S) |
| Gln (Q) | Asn (N) |
| Glu (E) | Asp (D) |
| His (H) | Asn (N), Gln (Q), Lys (K), Arg (R) |
| Ile (I) | Leu (L), Val (V), Met (M), Ala (A), Phe (F) |
| Leu (L) | Ile (I), Val (V), Met (M), Ala (A), Phe (F) |
| Lys (K) | Arg (R), Gln (Q), Asn (N) |
| Met (M) | Leu (L), Phe (F), Ile (I) |
| Phe (F) | Leu (L), Val (V), Ile (I), Ala (A) |
| Pro (P) | Gly (G) |
| Ser (S) | Thr (T) |
| Thr (T) | Ser (S) |
| Trp (W) | Tyr (Y) |
| Tyr (Y) | Trp (W), Phe (F), Thr (D), Ser (S) |
| Val (V) | Ile (I), Leu (L), Met (M), Phe (F), Ala (A) |

Exemplary nucleic acids which may be introduced to a host cell include, for example, DNA sequences or genes from another species, or even genes or sequences which originate with or are present in the same species, but are incorporated into recipient cells by genetic engineering methods. The term "exogenous" is also intended to refer to genes that are not normally present in the cell being transformed, or perhaps simply not present in the form, structure, etc., as found in the transforming DNA segment or gene, or genes which are normally present and that one desires to express in a manner that differs from the natural expression pattern, e.g., to over-express. Thus, the term "exogenous" gene or DNA is intended to refer to any gene or DNA segment that is introduced into a recipient cell, regardless of whether a similar gene may already be present in such a cell. The type of DNA included in the exogenous DNA can include DNA which is already present in the cell, DNA from another individual of the same type of organism, DNA from a different organism, or a DNA generated externally, such as a DNA sequence containing an antisense message of a gene, or a DNA sequence encoding a synthetic or modified version of a gene.

Host strains developed according to the approaches described herein can be evaluated by a number of means known in the art (see e.g., Studier (2005) Protein Expr Purif. 41 (1), 207-234; Gellissen, ed. (2005) Production of Recombinant Proteins: Novel Microbial and Eukaryotic Expression Systems, Wiley-VCH, ISBN-10:3527310363; Baneyx (2004) Protein Expression Technologies, Taylor & Francis, ISBN-10:0954523253).

Methods of down-regulation or silencing genes are known in the art. For example, expressed protein activity can be down-regulated or eliminated using antisense oligonucleotides, protein aptamers, nucleotide aptamers, and RNA interference (RNAi) (e.g., small interfering RNAs (siRNA), short hairpin RNA (shRNA), and micro RNAs (miRNA) (see e.g., Fanning and Symonds (2006) Handb Exp Pharmacol. 173, 289-303G, describing hammerhead ribozymes and small hairpin RNA; Helene, C., et al. (1992) Ann. N.Y. Acad. Sci. 660, 27-36; Maher (1992) Bioassays 14 (12): 807-15, describing targeting deoxyribonucleotide sequences; Lee et al. (2006) Curr Opin Chem Biol. 10, 1-8, describing aptamers; Reynolds et al. (2004) Nature Biotechnology 22 (3), 326-330, describing RNAi; Pushparaj and Melendez (2006) Clinical and Experimental Pharmacology and Physiology 33 (5-6), 504-510, describing RNAi; Dillon et al. (2005) Annual Review of Physiology 67, 147-173, describing RNAi; Dykxhoorn and Lieberman (2005) Annual Review of Medicine 56, 401-423, describing RNAI). RNAi molecules are commercially available from a variety of sources (e.g., Ambion, TX; Sigma Aldrich, MO; Invitrogen). Several siRNA molecule design programs using a variety of algorithms are known to the art (see e.g., Cenix algorithm, Ambion; BLOCK-IT™ RNAI Designer, Invitrogen; siRNA Whitehead Institute Design Tools, Bioinformatics & Research Computing). Traits influential in defining optimal siRNA sequences include G/C content at the termini of the siRNAs, $T_m$ of specific internal domains of the siRNA, siRNA length, position of the target sequence within the CDS (coding region), and nucleotide content of the 3' overhangs.

Formulation

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject.

The term "formulation" refers to preparing a drug in a form suitable for administration to a subject, such as a human. Thus, a "formulation" can include pharmaceutically acceptable excipients, including diluents or carriers.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutical active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, parenteral, pulmonary, oral, topical, intradermal, intramuscular, intraperitoneal, intravenous, subcutaneous, intranasal, epidural, ophthalmic, buccal, and rectal. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic or other physical forces.

Controlled-release (or sustained-release) preparations may be formulated to extend the activity of the agent(s) and reduce dosage frequency. Controlled-release preparations can also be used to effect the time of onset of action or other characteristics, such as blood levels of the agent, and consequently affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

Agents or compositions described herein can also be used in combination with other therapeutic modalities, as described further below. Thus, in addition to the therapies described herein, one may also provide to the subject other therapies known to be efficacious for treatment of the disease, disorder, or condition.

Therapeutic Methods

Also provided is a process of treating a CNS autoimmune associated disease, disorder, or condition (e.g., MS) in a subject in need thereof though administration of a therapeutically effective amount of an interferon Lambda (IFNλ) inhibiting agent (e.g., an inhibitor of IFN-λ signaling). Administration of the IFNλ inhibiting agent can reduce or prevent CNS autoimmune inflammation or nerve damage.

Methods described herein are generally performed on a subject in need thereof. A subject in need of the therapeutic methods described herein can be a subject having, diagnosed with, suspected of having, or at risk for developing a CNS autoimmune associated disease, disorder, or condition (e.g., MS). A determination of the need for treatment will typically be assessed by a history and physical exam consistent with the disease or condition at issue. Diagnosis of the various conditions treatable by the methods described herein is within the skill of the art. The subject can be an animal subject, including a mammal, such as horses, cows, dogs, cats, sheep, pigs, mice, rats, monkeys, hamsters, guinea pigs, and chickens, and humans. For example, the subject can be a human subject.

Generally, a safe and effective amount of an IFNλ inhibitor is, for example, that amount that would cause the desired therapeutic effect in a subject while minimizing undesired side effects. In various embodiments, an effective amount of an IFNλ inhibitor described herein can substantially inhibit CNS autoimmune inflammation or nerve damage, slow the progress of CNS autoimmune inflammation or nerve damage, or limit the development of CNS autoimmune inflammation or nerve damage.

According to the methods described herein, administration can be parenteral, pulmonary, oral, topical, intradermal, intramuscular, intraperitoneal, intravenous, subcutaneous, intranasal, epidural, ophthalmic, buccal, or rectal administration.

When used in the treatments described herein, a therapeutically effective amount of an IFNλ inhibitor can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to reduce or prevent CNS autoimmune inflammation or nerve damage.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, 4th ed., Lippincott Williams & Wilkins, ISBN 0781741475; Sharqel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or to a physician.

Administration of an IFNλ inhibitor can occur as a single event or over a time course of treatment. For example, an IFNλ inhibitor can be administered daily, weekly, bi-weekly, or monthly. For treatment of acute conditions, the time course of treatment will usually be at least several days. Certain conditions could extend treatment from several days to several weeks. For example, treatment could extend over one week, two weeks, or three weeks. For more chronic conditions, treatment could extend from several weeks to several months or even a year or more.

Treatment in accord with the methods described herein can be performed prior to, concurrent with, or after conventional treatment modalities for a CNS autoimmune associated disease, disorder, or condition (e.g., MS).

An IFNλ inhibitor can be administered simultaneously or sequentially with another agent, such as an antibiotic, an anti-inflammatory, or another agent. For example, an IFNλ inhibitor can be administered simultaneously with another agent, such as an antibiotic or an anti-inflammatory. Simultaneous administration can occur through administration of separate compositions, each containing one or more of an IFNλ inhibitor, an antibiotic, an anti-inflammatory, or another agent. Simultaneous administration can occur through administration of one composition containing two or more of an IFNλ inhibitor, an antibiotic, an anti-inflammatory, or another agent. An IFNλ inhibitor can be administered sequentially with an antibiotic, an anti-inflammatory, or another agent. For example, an IFNλ inhibitor can be administered before or after administration of an antibiotic, an anti-inflammatory, or another agent.

Administration

Agents and compositions described herein can be administered according to methods described herein in a variety of means known to the art. The agents and composition can be used therapeutically either as exogenous materials or as endogenous materials. Exogenous agents are those produced or manufactured outside of the body and administered to the body. Endogenous agents are those produced or manufactured inside the body by some type of device (biologic or other) for delivery within or to other organs in the body.

As discussed above, administration can be parenteral, pulmonary, oral, topical, intradermal, intramuscular, intraperitoneal, intravenous, subcutaneous, intranasal, epidural, ophthalmic, buccal, or rectal administration.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 μm), nanospheres (e.g., less than 1 μm), microspheres (e.g., 1-100 μm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10:0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency, improve taste of the product; or improve shelf life of the product.

Screening

Also provided are methods for screening for INFλ inhibiting agents.

The subject methods find use in the screening of a variety of different candidate molecules (e.g., potentially therapeutic candidate molecules). Candidate substances for screening according to the methods described herein include, but are not limited to, fractions of tissues or cells, nucleic acids, polypeptides, siRNAs, antisense molecules, aptamers, ribozymes, triple helix compounds, antibodies, and small (e.g., less than about 2000 mw, or less than about 1000 mw, or less than about 800 mw) organic molecules or inorganic molecules including but not limited to salts or metals.

Candidate molecules encompass numerous chemical classes, for example, organic molecules, such as small organic compounds having a molecular weight of more than 50 and less than about 2,500 Daltons. Candidate molecules can comprise functional groups necessary for structural interaction with proteins, particularly hydrogen bonding, and typically include at least an amine, carbonyl, hydroxyl or carboxyl group, and usually at least two of the functional chemical groups. The candidate molecules can comprise cyclical carbon or heterocyclic structures and/or aromatic or polyaromatic structures substituted with one or more of the above functional groups.

A candidate molecule can be a compound in a library database of compounds. One of skill in the art will be generally familiar with, for example, numerous databases for commercially available compounds for screening (see e.g., ZINC database, UCSF, with 2.7 million compounds over 12 distinct subsets of molecules; Irwin and Shoichet (2005) J Chem Inf Model 45, 177-182). One of skill in the art will also be familiar with a variety of search engines to identify commercial sources or desirable compounds and classes of compounds for further testing (see e.g., ZINC database; eMolecules.com; and electronic libraries of commercial compounds provided by vendors, for example: ChemBridge, Princeton BioMolecular, Amb$^{int}$er SARL, Enamine, ASDI, Life Chemicals etc.).

Candidate molecules for screening according to the methods described herein include both lead-like compounds and drug-like compounds. A lead-like compound is generally understood to have a relatively smaller scaffold-like structure (e.g., molecular weight of about 150 to about 350 kD) with relatively fewer features (e.g., less than about 3 hydrogen donors and/or less than about 6 hydrogen acceptors; hydrophobicity character xlogP of about-2 to about 4) (see e.g., Angewante (1999) Chemie Int. ed. Engl. 24, 3943-3948). In contrast, a drug-like compound is generally understood to have a relatively larger scaffold (e.g., molecular weight of about 150 to about 500 kD) with relatively more numerous features (e.g., less than about 10 hydrogen acceptors and/or less than about 8 rotatable bonds; hydrophobicity character xlogP of less than about 5) (see e.g., Lipinski (2000) J. Pharm. Tox. Methods 44, 235-249). Initial screening can be performed with lead-like compounds.

When designing a lead from spatial orientation data, it can be useful to understand that certain molecular structures are characterized as being "drug-like". Such characterization can be based on a set of empirically recognized qualities derived by comparing similarities across the breadth of known drugs within the pharmacopoeia. While it is not required for drugs to meet all, or even any, of these characterizations, it is far more likely for a drug candidate to meet with clinical successful if it is drug-like.

Several of these "drug-like" characteristics have been summarized into the four rules of Lipinski (generally known as the "rules of fives" because of the prevalence of the number 5 among them). While these rules generally relate to oral absorption and are used to predict bioavailability of compound during lead optimization, they can serve as effective guidelines for constructing a lead molecule during rational drug design efforts such as may be accomplished by using the methods of the present disclosure.

The four "rules of five" state that a candidate drug-like compound should have at least three of the following characteristics: (i) a weight less than 500 Daltons; (ii) a log of P less than 5; (iii) no more than 5 hydrogen bond donors (expressed as the sum of OH and NH groups); and (iv) no more than 10 hydrogen bond acceptors (the sum of N and O atoms). Also, drug-like molecules typically have a span (breadth) of between about 8 Å to about 15 Å. Compositions and methods described herein utilizing molecular biology protocols can be according to a variety of standard techniques known to the art (see, e.g., Sambrook and Russel (2006) Condensed Protocols from Molecular Cloning: A Laboratory Manual, Cold Spring Harbor Laboratory Press, ISBN-10:0879697717; Ausubel et al. (2002) Short Protocols in Molecular Biology, 5th ed., Current Protocols, ISBN-10: 0471250929; Sambrook and Russel (2001) Molecular Cloning: A Laboratory Manual, 3d ed., Cold Spring Harbor Laboratory Press, ISBN-10:0879695773; Elhai, J. and Wolk, C. P. 1988. Methods in Enzymology 167, 747-754; Studier (2005) Protein Expr Purif. 41 (1), 207-234; Gellissen, ed. (2005) Production of Recombinant Proteins: Novel Microbial and Eukaryotic Expression Systems, Wiley-VCH, ISBN-10:3527310363; Baneyx (2004) Protein Expression Technologies, Taylor & Francis, ISBN-10:0954523253).

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

Examples

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Myeloid Cells Require IFN-λ for the Maintenance of Autoimmune Neuroinflammation The following example describes experiments showing myeloid cells require IFN-λ for maintenance of autoimmune neuroinflammation. IFNλ exhibits antiviral properties, promotes Th1 responses and augments effector T cell function during chronic infections. However, the role of IFNλ in Th1-dependent autoimmune neuroinflammation has yet to be explored. Due to the localized effects of IFNλ, therapeutic targeting holds potential. The objective was to identify the role(s) of IFNλ signaling during the course of experimental autoimmune encephalomyelitis (EAE), characterize its expression in two subtypes of multiple sclerosis (MS) and determine the therapeutic potential of IFNλ targeting. This example showed loss of IFNLR1 resulted in recovery from EAE and axonal sparing. IFNλ signaling is critical in maintaining neuroinflammation by contributing to myeloid cell activation and sustained T cell effector function without promotion of counter-regulatory mechanisms. Further, endothelial IFNλ expression is increased in a chronic form of MS and neutralization of an IFNλ isoform promotes EAE recovery. These findings reveal a novel role for IFNλ in maintaining neuroinflammation and suggest for the first time that therapeutic targeting of IFNλ may be beneficial for the treatment of MS patients with progressive disease.

Results and Discussion

Figure 1B:
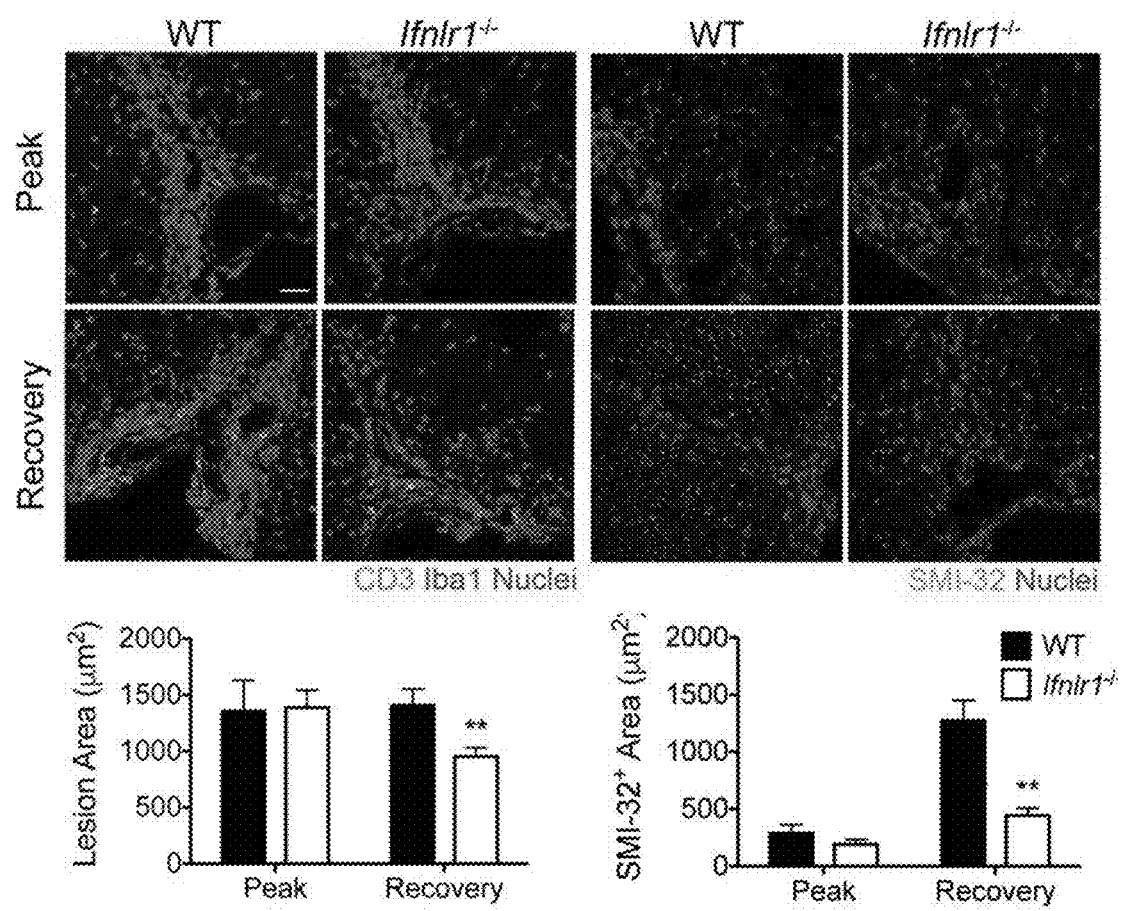
Figure 1C:
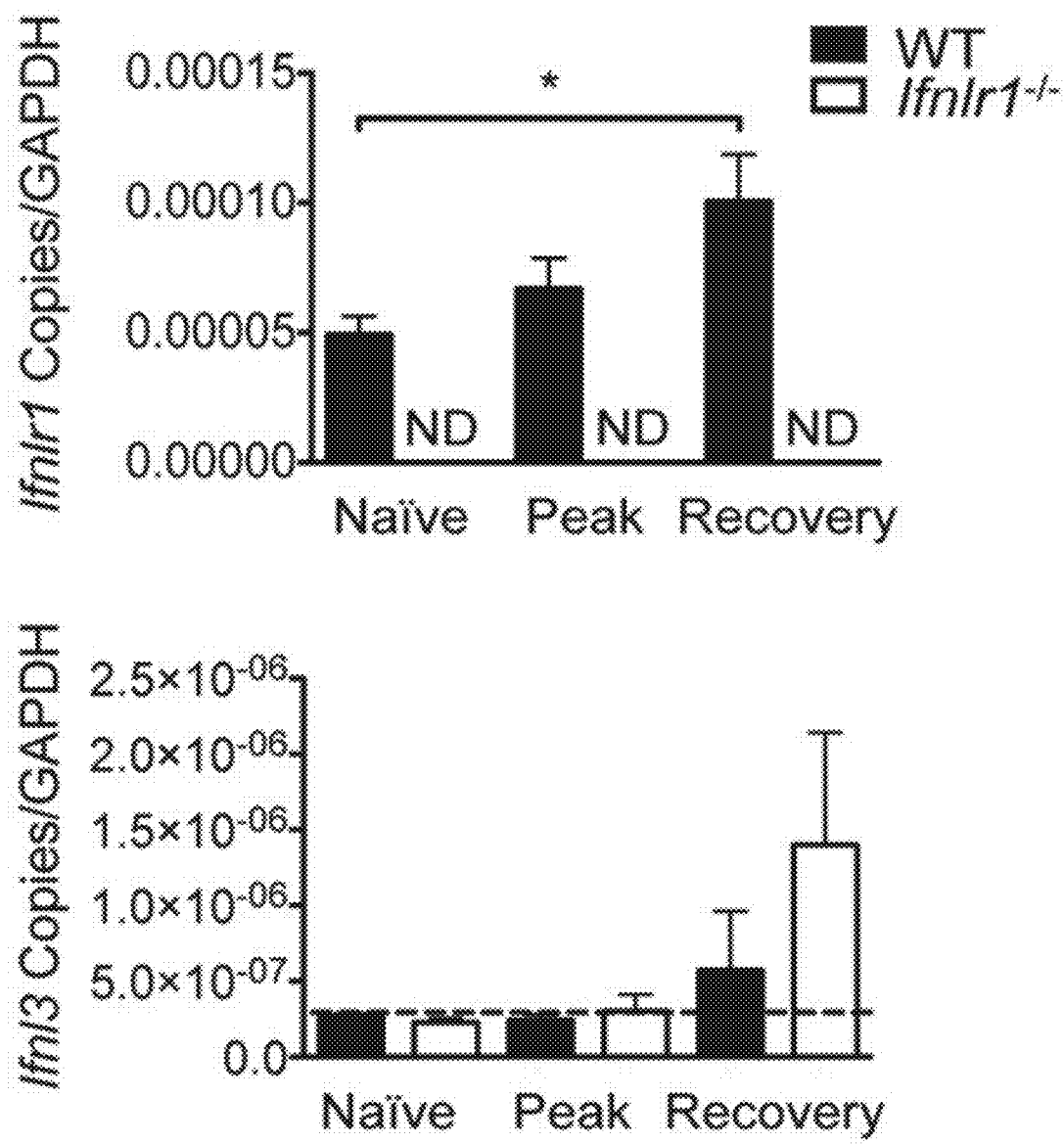
Figure 2A:
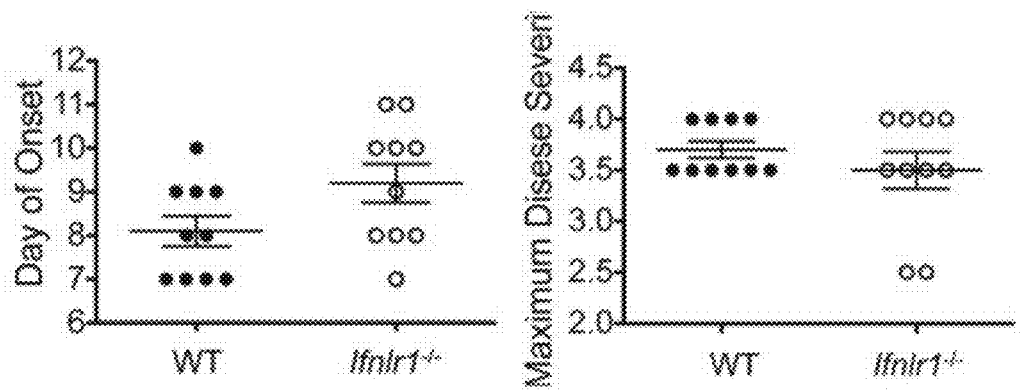
FIG. 2A-FIG. 2B is a series of graphs and images showing that acute CNS inflammation and myelin loss is unaffected by IFNλ deficiency. Activated Thy1.1$^+$, MOG specific Th1 clones were injected retroorbitally into naïve WT or Ifnlr1$^{-/-}$ mice.
Figure 2B:
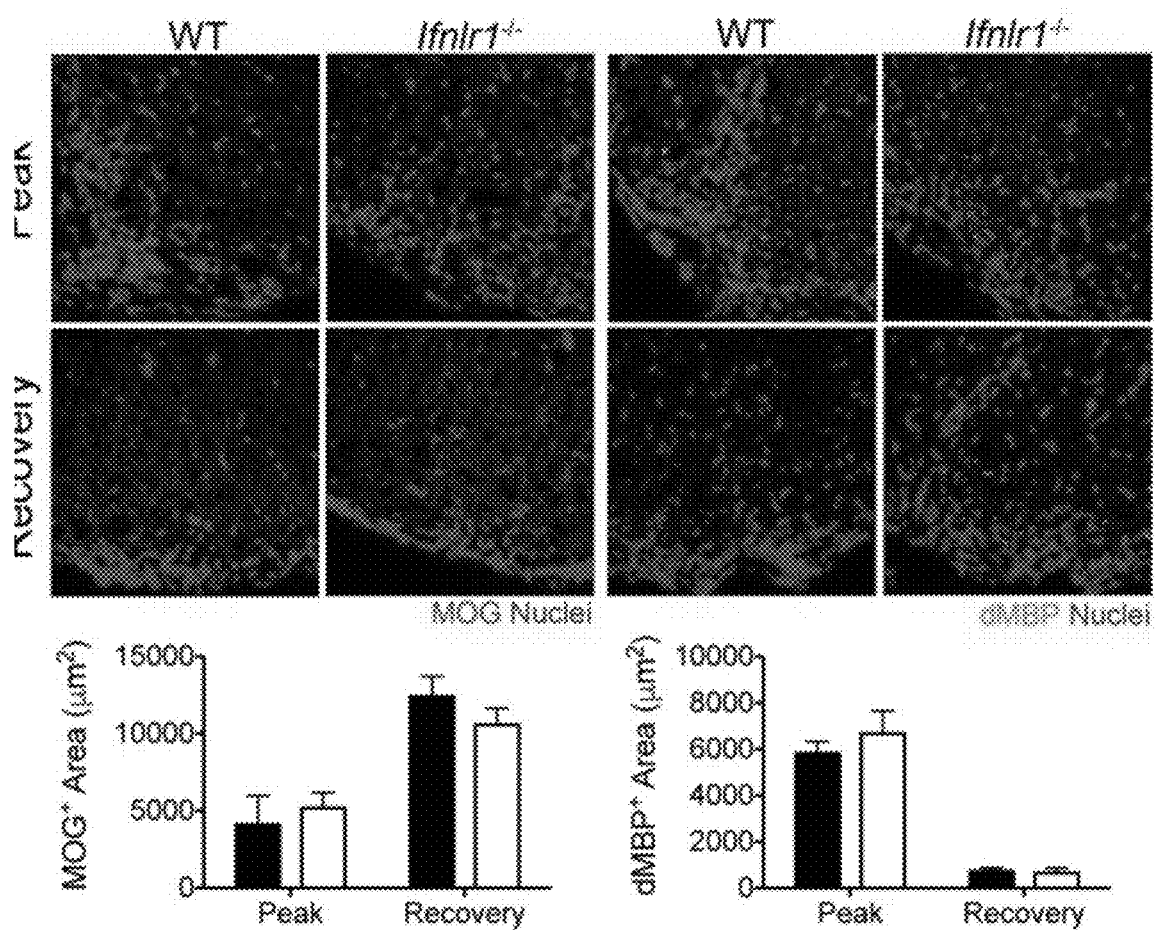

To determine the effect of IFNλ signaling in a Th1 CNS autoimmune disease EAE was induced in WT and Ifnlr1$^{-/-}$ mice. While WT and Ifnlr1$^{-/-}$ mice developed acute EAE similarly (see e.g., FIG. 1A and FIG. 2A), Ifnlr1$^{-/-}$ mice exhibited a marked recovery while WT mice had a chronic disease course (see e.g., FIG. 1A). Corresponding with EAE progression, WT mice exhibited sustained lesion size and an increase in axonal damage (see e.g., FIG. 1B), and increased expression of Ifnlr1 and Ifnl3 transcripts in the spinal cord at a time point when Ifnlr1$^{-/-}$ mice began recovering (see e.g., FIG. 1C). These data are consistent with IFNλ promotion of Th1 responses during chronic, but not transient, viral infection and suggest that IFNλ signaling limits recovery from Th1-mediated, autoimmune inflammation.

Figure 1E:
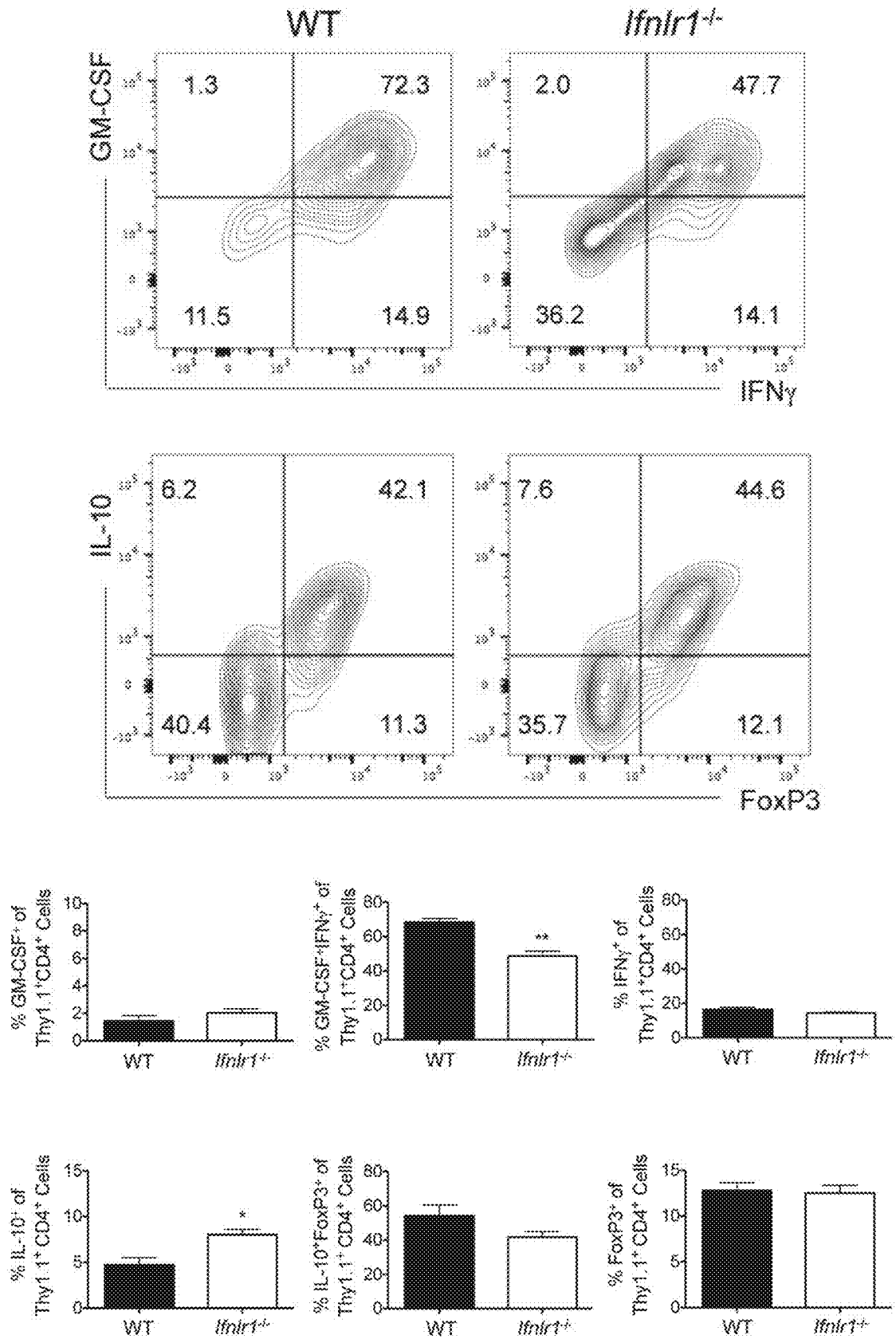

In certain models of autoimmunity and in vitro, IFNλ has been shown to inhibit CD4$^+$Th2 and Th17 responses and promote IFNλ production, indicating that IFNλ may enhance Th1 function. Conversely, IFNλ-primed DCs are known to induce proliferation of CD4$^+$ FoxP3$^+$ suppressor cells, which dampen T cell effector functions during CNS inflammation. Since EAE pathogenesis is heavily reliant on T cell expression of IFNλ and GM-CSF and can be suppressed by FoxP3$^+$T cells, the profiles of spinal cord-infiltrating CD4$^+$T cells during recovery were analyzed. Compared to WT, Ifnlr1$^{-/-}$ mice had a significantly larger population of donor Thy1.1$^+$CD4$^+$ cells (see e.g., FIG. 1D) with suppressed expression of IFNλ$^+$GM-CSF$^+$ and a modest increase in IL-10$^+$, but no change in FoxP3$^+$IL-10$^+$or FoxP3$^+$ cells (see e.g., FIG. 1E). The expression of IL-17 by Thy1.1$^+$ cells was found to be minimal and similar between groups (WT: 2.3±0.5%; Ifnlr1$^{-/-}$: 2.5±0.7%). This indicates that loss of IFNλ signaling does not promote a conversion of effector CD4$^+$T cells to a regulatory phenotype.

Figure 3A:
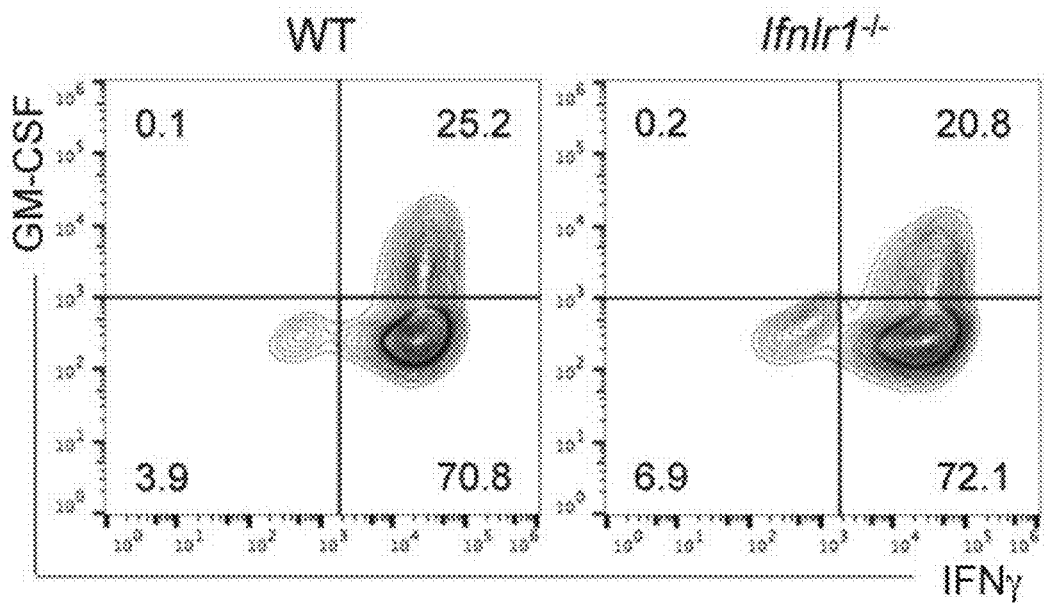
FIG. 3A-FIG. 3B is a series of plots showing that IFNLR1 is not required for T cell priming. WT and Ifnlr1/mice were immunized for EAE, cells were collected from draining lymph nodes and cultured in the presence of immunizing peptide and Th1-promoting cytokines with irradiated WT APCs.
Figure 3B:
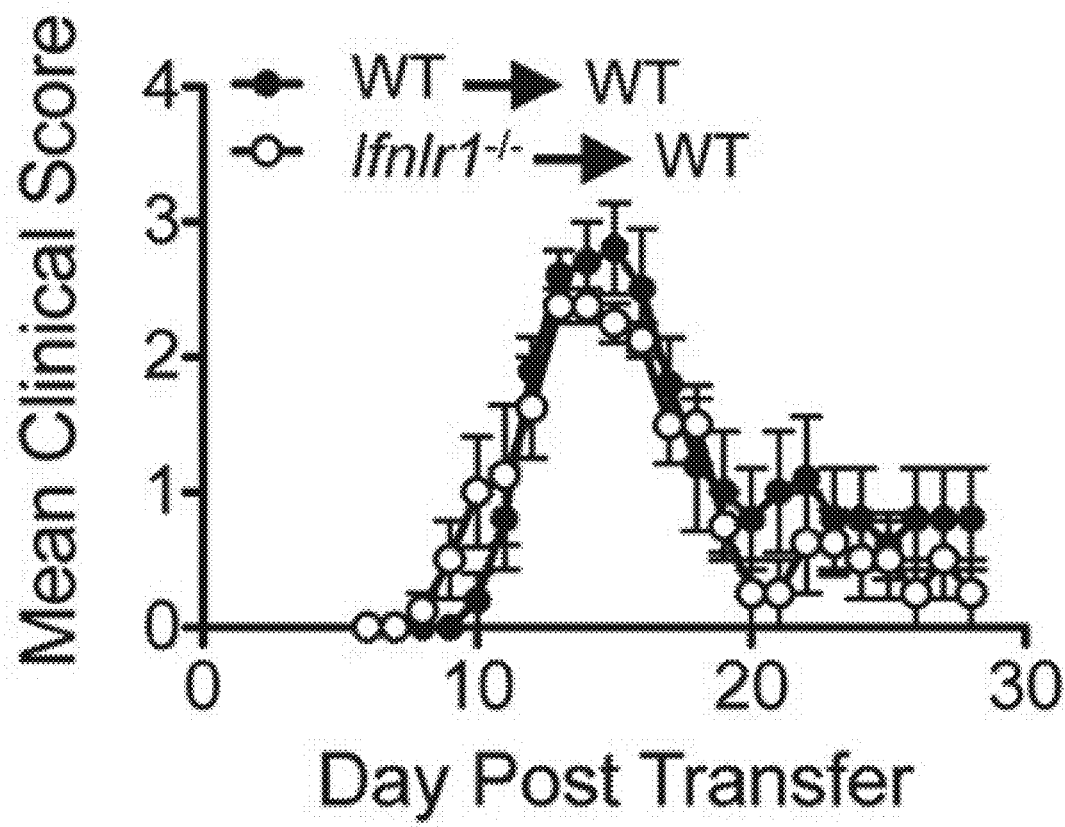

Since CD4$^+$ T cells are known to express IFNLR1, it is possible that an inherent T cell deficit was responsible for the recovery from EAE in Ifnlr1-deficient animals. Following immunization of WT and Ifnlr1$^{-/-}$ mice and immunizing peptide restimulation in vitro with APCs, IFNλ and GM-CSF expression in WT and Ifnlr1-+-Th1 cells was similar (see e.g., FIG. 3A). Further, activated WT and Ifnlr1$^{-/-}$ T cells were able to induce EAE to the same extent following T cell transfer to naïve, WT mice (see e.g., FIG. 3B). Together, this suggests that IFNλ signaling does not affect T cell priming or encephalitogenic capacity.

Figure 4A:
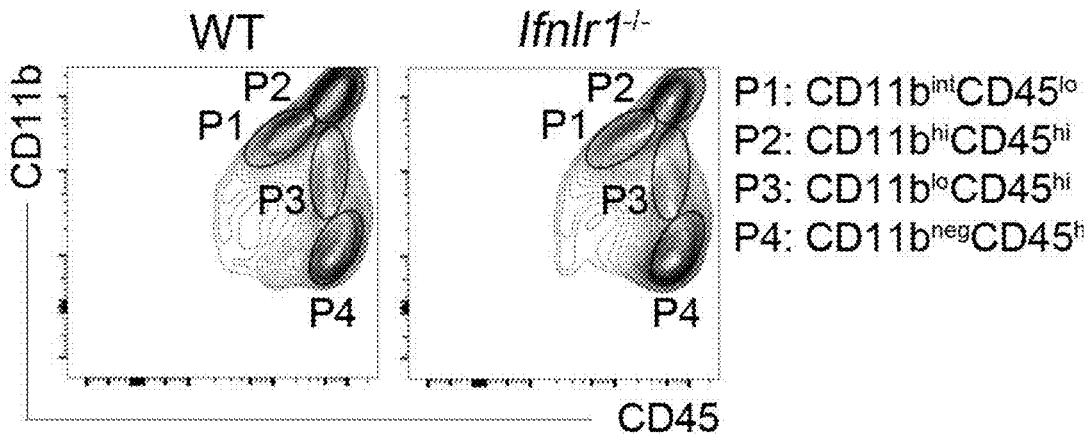
FIG. 4A-FIG. 4F is a series of graphs showing that myeloid cell activation and T cell education is facilitated by interferon-λ signaling following acute EAE. WT Th1 clones were injected retroorbitally into naïve WT or Ifnlr1$^{-/-}$ mice. At the recovery timepoint (see e.g., FIG. 1A), spinal cord leukocytes were isolated for flow cytometric analysis.
Figure 4B:
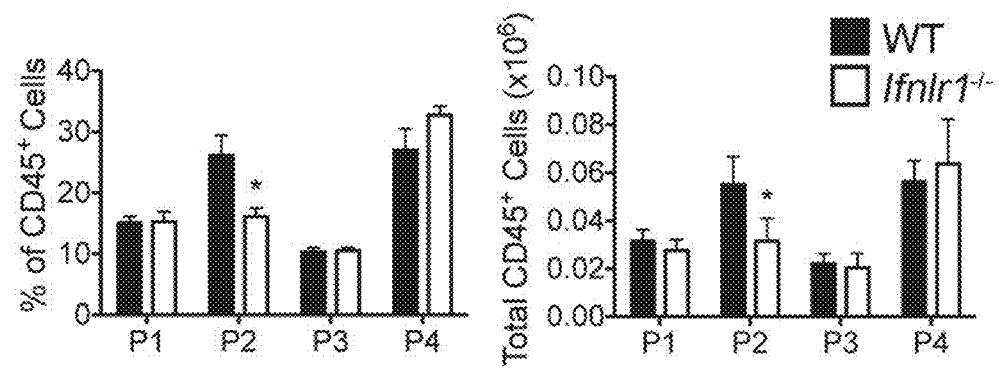
Figure 4C:
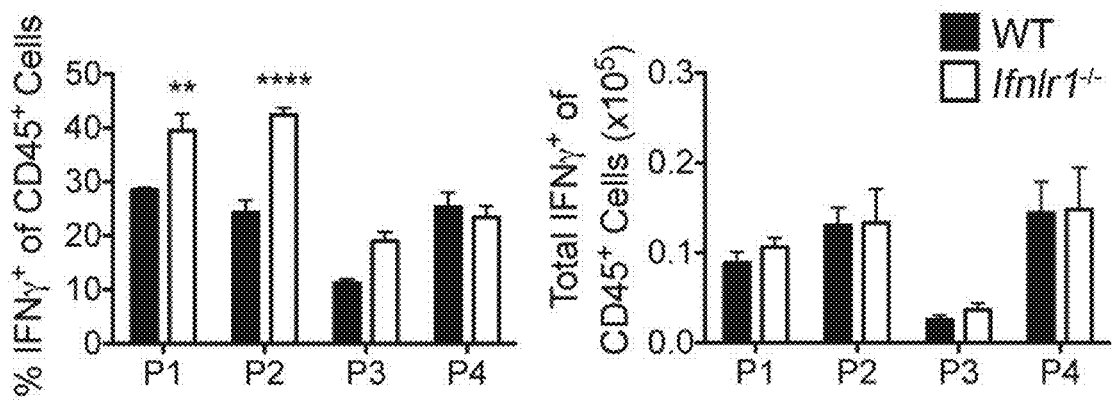
Figure 4D:
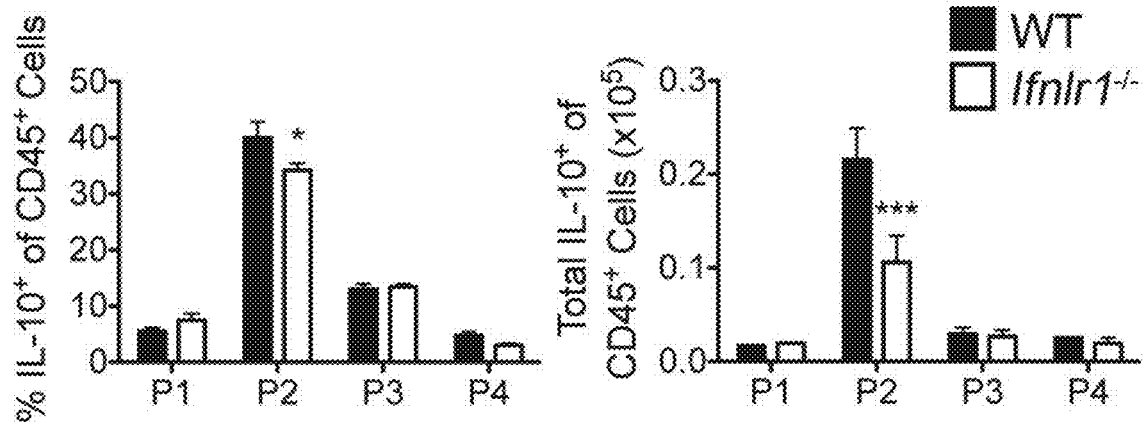
Figure 5A:
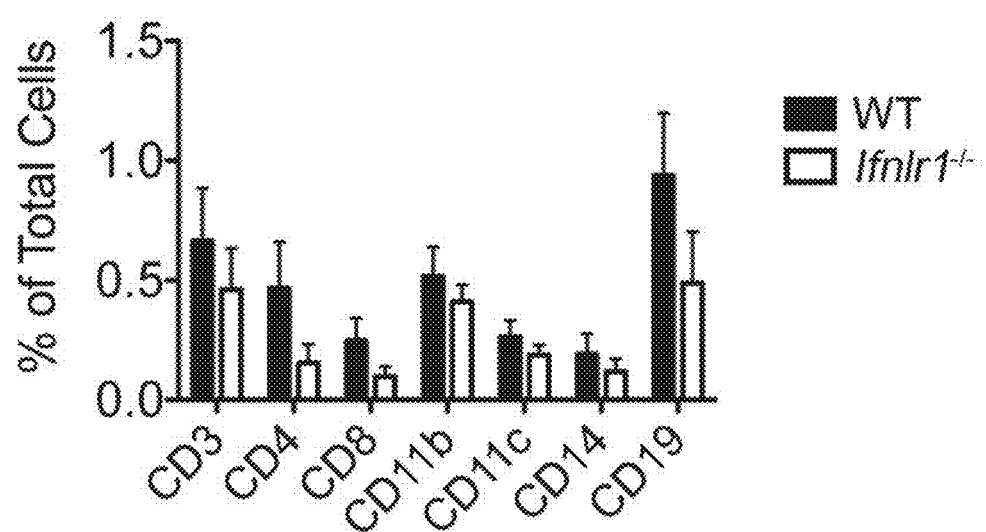
FIG. 5A-FIG. 5B is a series of graphs showing that patrolling monocytes are more prevalent in the absence of interferon-A signaling. Peripheral blood cells were collected from naïve WT and Ifnlr1$^{-/-}$ mice by submandibular puncture.
Figure 5B:
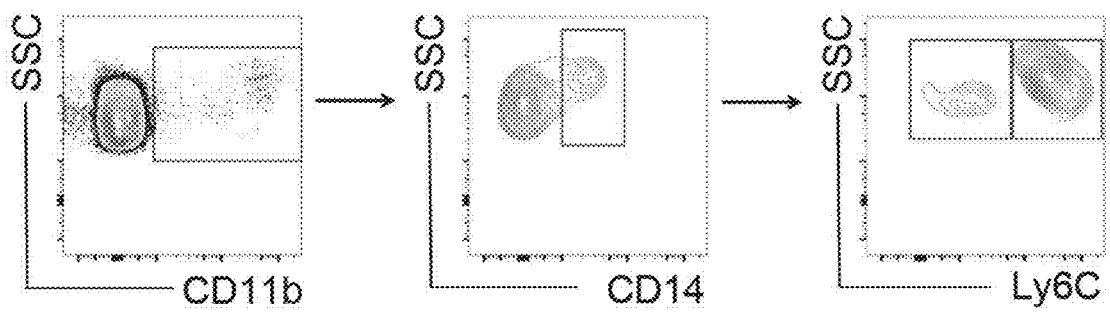
Figure 5B:
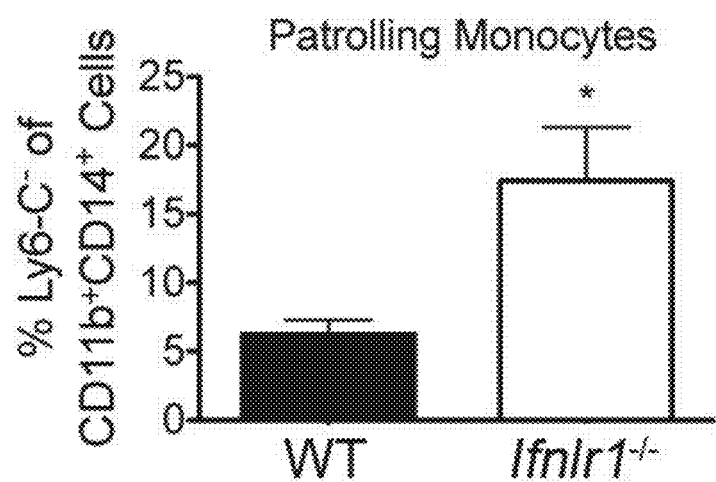
Figure 5B:
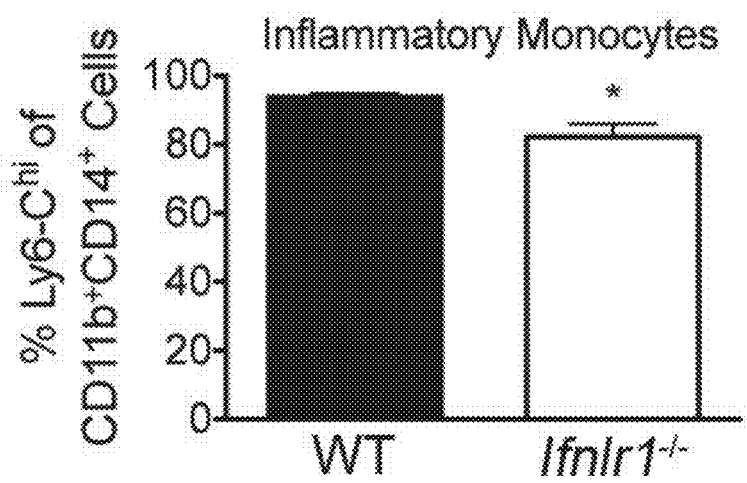
Figure 6A:
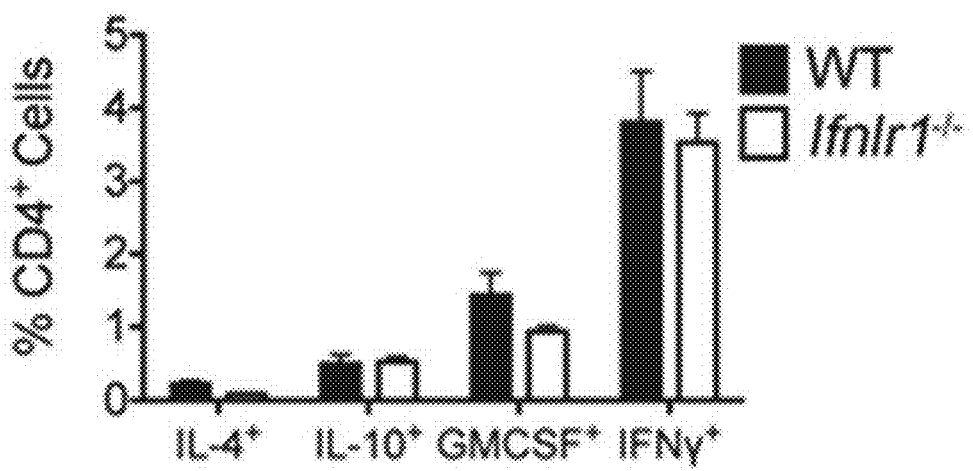
FIG. 6A-FIG. 6C is a series of graphs showing that interferon-A signaling is dispensable for the onset of inflammation during EAE. WT and Ifnlr1/mice were immunized for EAE and following the onset of disease, cells from draining lymph nodes of WT and Ifnlr1$^{-/-}$ mice were isolated for flow cytometric analysis.
Figure 6B:
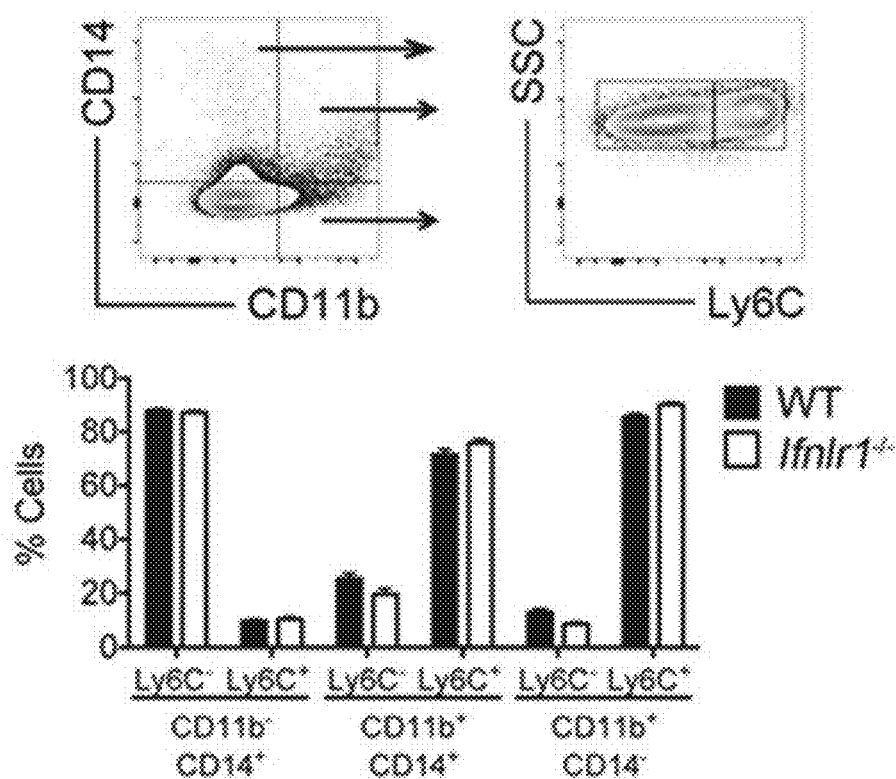
Figure 6C:
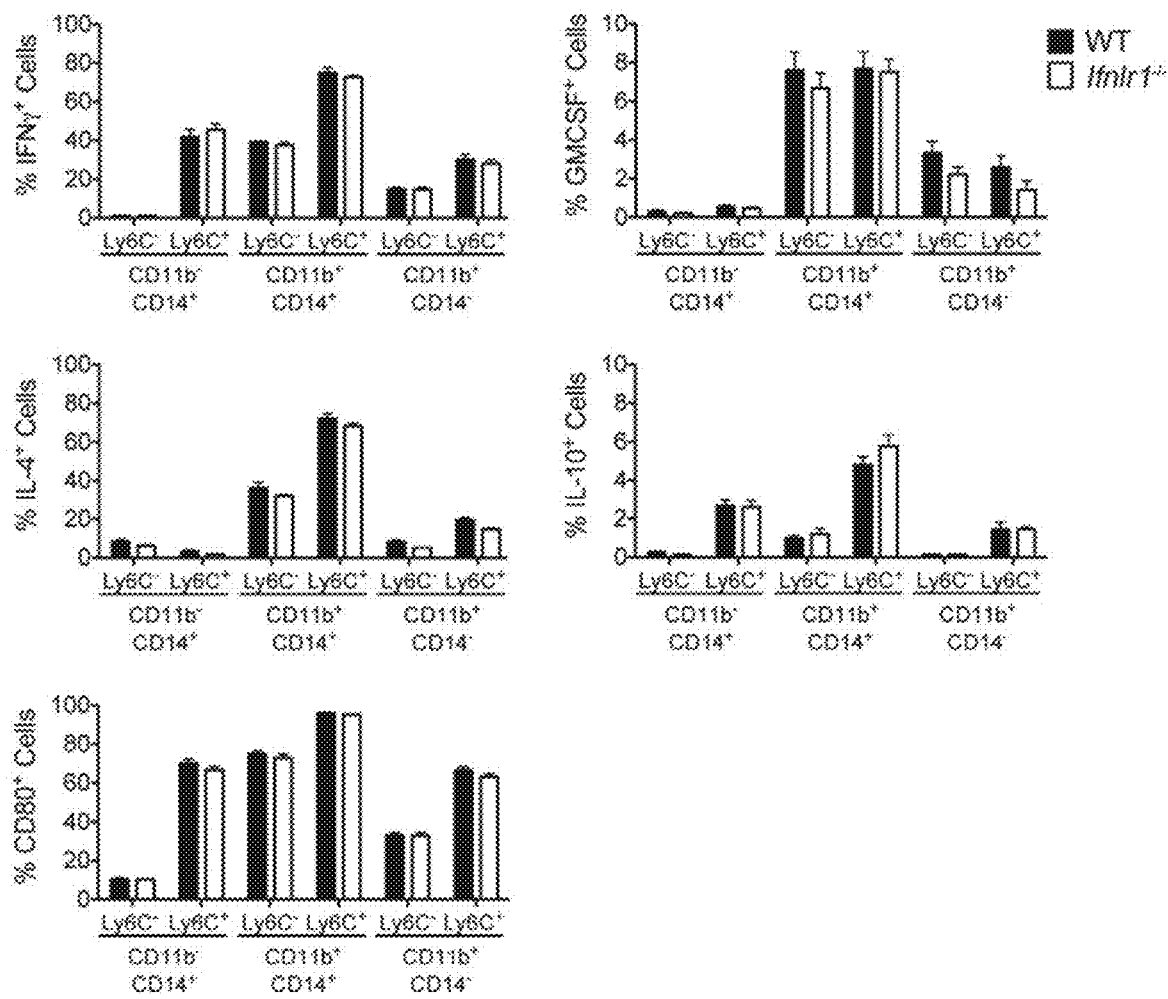

Since the effects of Ifnlr1 appear T cell extrinsic, the CNS myeloid cell compartment during EAE recovery was analyzed. Myeloid and lymphoid subsets of resident versus infiltrating cells were determined within CD45$^+$ cells: P1, CD11b$^{int}$CD45$^{lo}$; P2, CD11b$^{hi}$CD45$^{hi}$; P3, CD11b$^{lo}$CD45$^{hi}$ and P4, CD11b$^{neg}$CD45$^{hi}$ cells, which are likely to be microglia, monocytes/macrophages, dendritic cells and lymphocytes, respectively (see e.g., FIG. 4A). While there were no differences in percentages or total cell number in the P1, P3 or P4 populations, the proportion and number of cells in P2 (CD11b$^{hi}$CD45$^{hi}$) was significantly decreased in the spinal cords of Ifnlr1$^{-/-}$ mice during EAE recovery (see e.g., FIG. 4B). Cytokine expression analysis revealed an increase in the proportion of IFNλ-expressing cells among the CD11b$^{int}$CD45 and CD11b$^{hi}$CD45$^{hi}$ populations in Ifnlr1$^{-/-}$ mice during recovery; however, the total number of IFNλ$^+$ cells was not different between genotypes (see e.g., FIG. 4C). A significant decrease in both the proportion and number of IL-10-expressing CD11b$^{hi}$CD45$^{hi}$ cells in the absence of IFNλ signaling was found (see e.g., FIG. 4D), consistent with reports indicating IFNλ induces expression of IL-10 from human peripheral blood mononuclear cells. The peripheral blood of naïve mice was analyzed to ensure the reduction of cells in P2 was not due to improper development of the myeloid compartment in Ifnlr1/mice. While a subpopulation of CD11b$^+$CD14$^+$Ly6-C-monocytes known to patrol during steady state conditions and contribute to anti-inflammatory processes were enhanced in Ifnlr1$^{-/-}$ mice (see e.g., FIG. 5B), this distribution in CD11b$^+$CD14$^+$Ly6-C$^-$ or Ly6-C$^+$ monocytes did not persist following inflammation induced by active immunization (see e.g., FIG. 6). These data suggest that IFNλ signaling is dispensable for the induction of inflammation, but is critical for the maintenance of APC-driven T cell responses in the CNS.

Figure 4E:
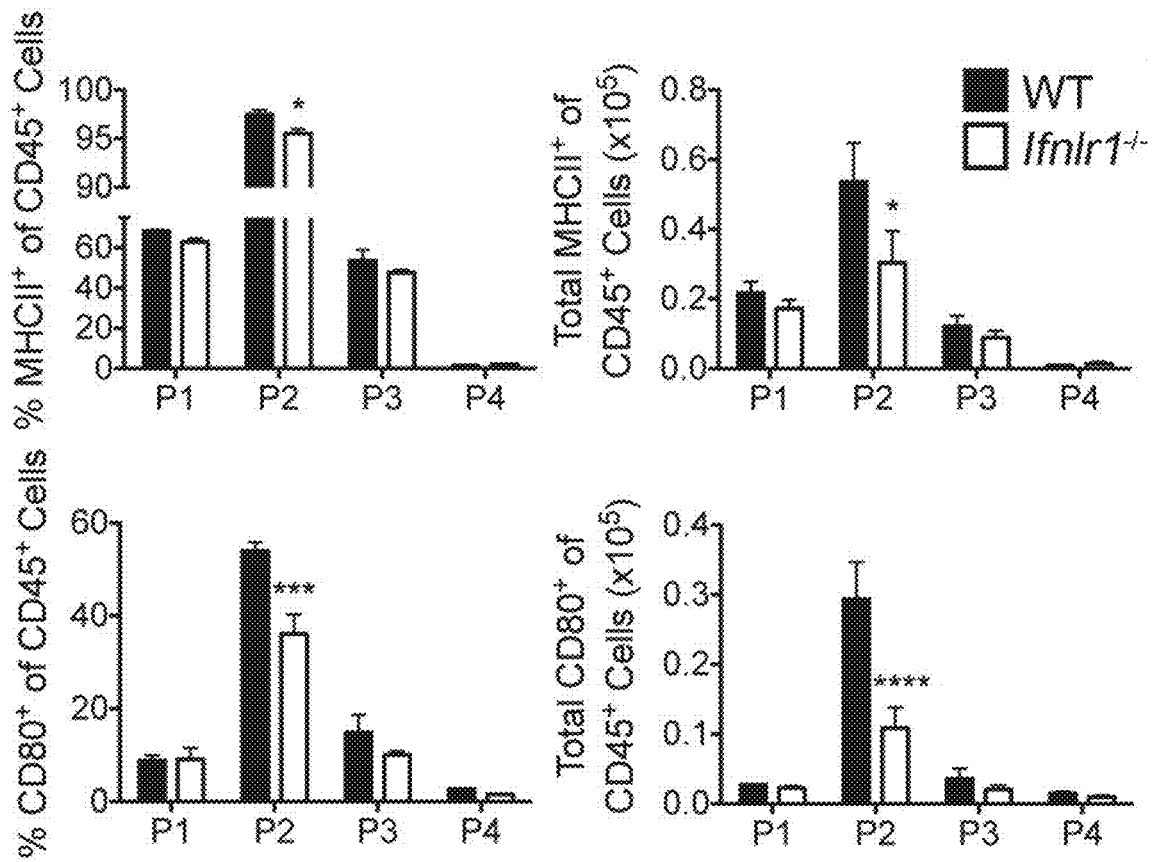
Figure 4F:
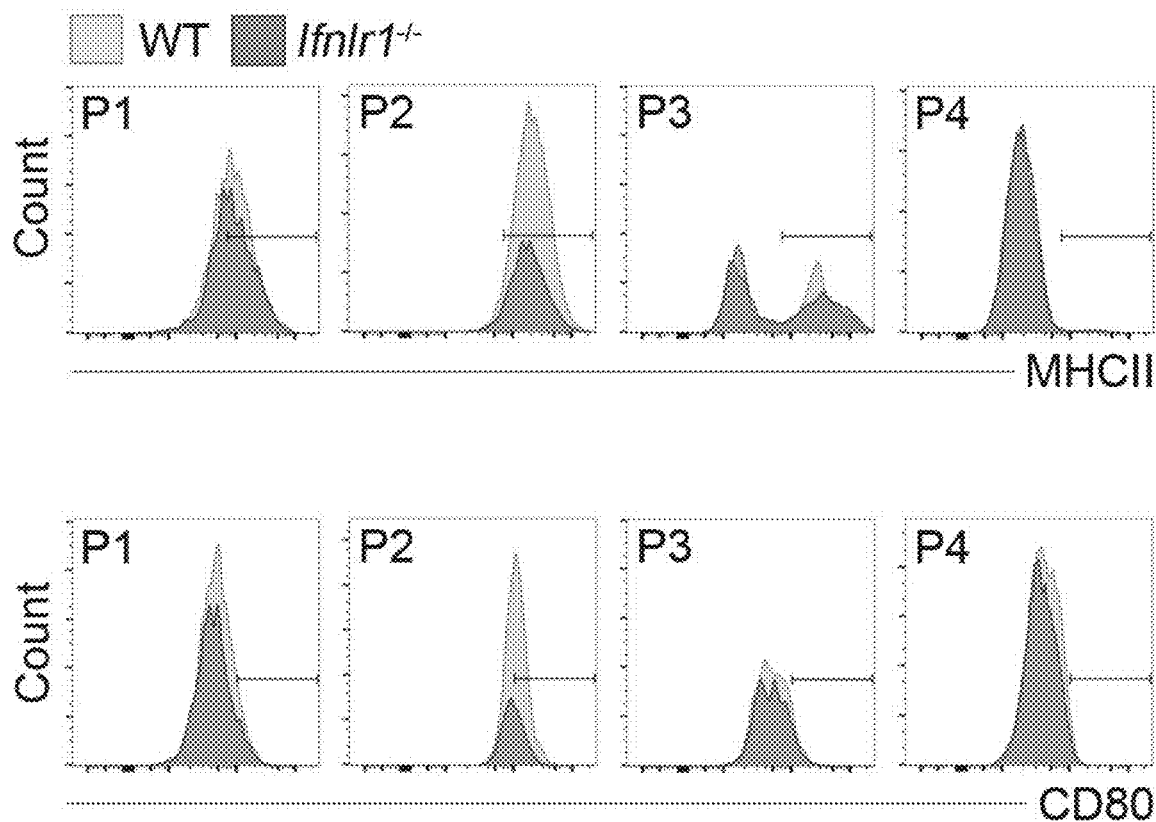

In addition to cytokine expression, MHCII and costimulatory molecules, like CD80, are required for effective CD4$^+$T cell education during EAE and are regulated by IFNs. Therefore, the impact of the loss of Ifnlr1 on the ability of myeloid cells to activate T cells during EAE was determined. Analyzing the cell populations described in FIG. 2A, a decrease in the proportion and number of MHCII$^+$ and CD80$^+$ cells was found within the CD11b$^{hi}$CD45$^{hi}$ population of Ifnlr1$^{-/-}$ mice compared to WT mice during EAE recovery. Interestingly, the expression of MHCII and CD80 was unchanged in other CNS myeloid cell populations (see e.g., FIG. 4E, FIG. 4F). These data suggest that in the absence of Ifnlr1, CD11b$^{hi}$CD45$^{hi}$ cells have decreased ability to provide accessory signals necessary for proper T helper cell activation and sustain inflammation in the CNS.

Figure 7A:
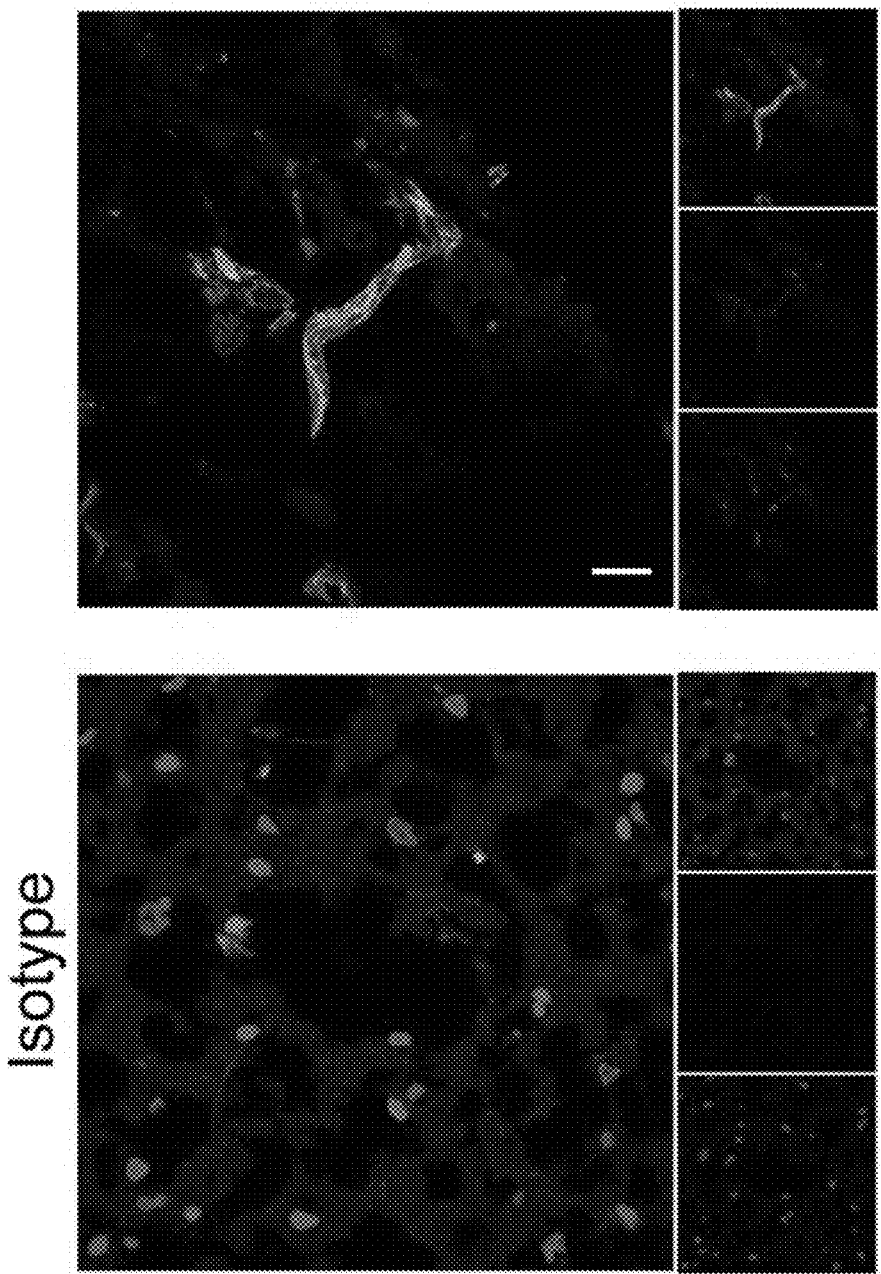
FIG. 7A-FIG. 7D is a series of images and graphs showing that endothelial interferon-λ is increased in progressive MS lesions and is a viable therapeutic target.
Figure 7B:
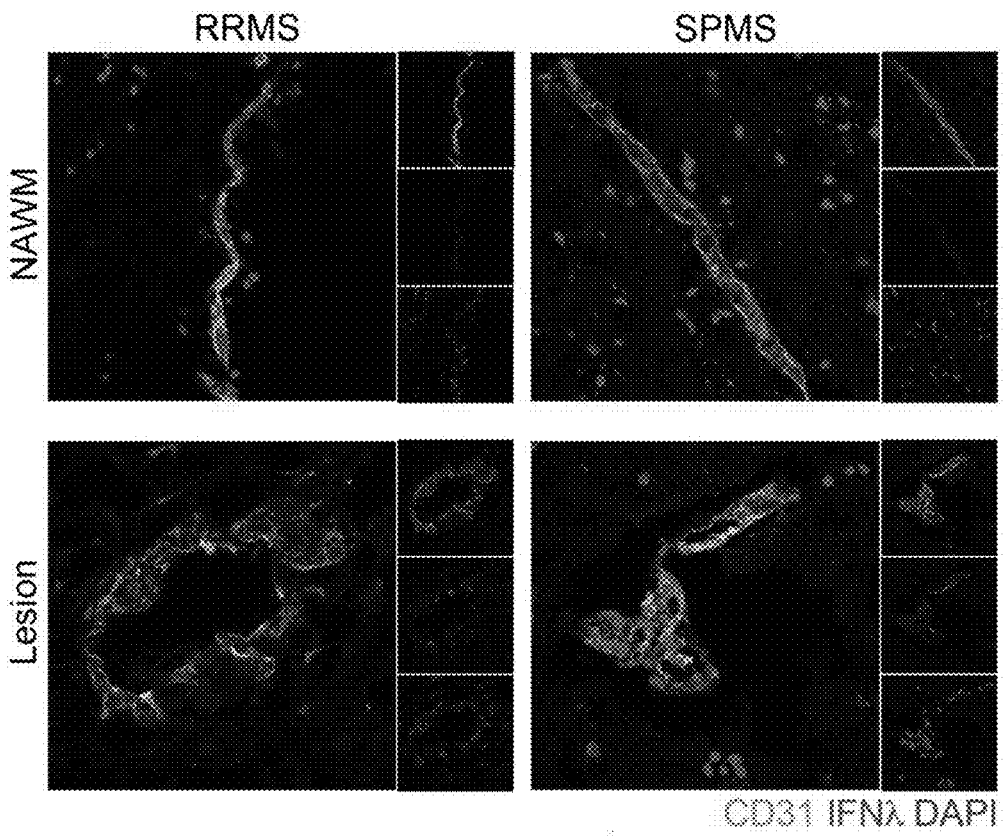
Figure 7C:
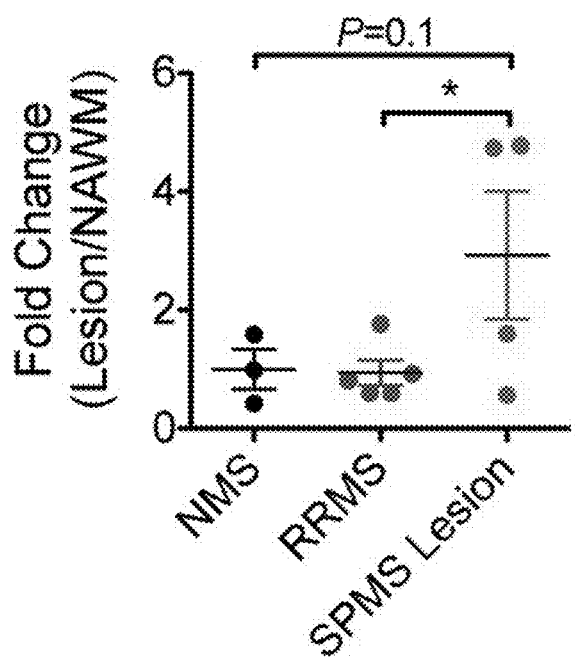
Figure 7D:
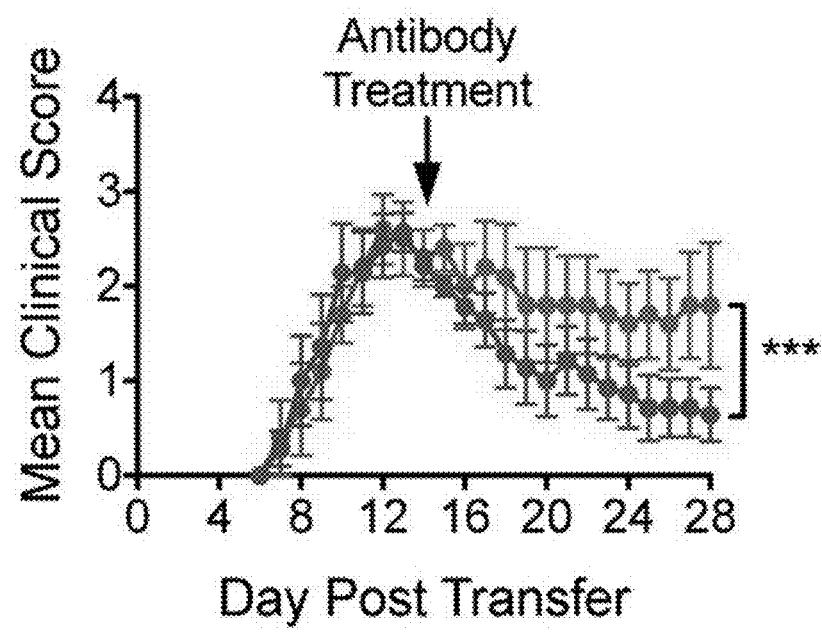
Figure 7D:
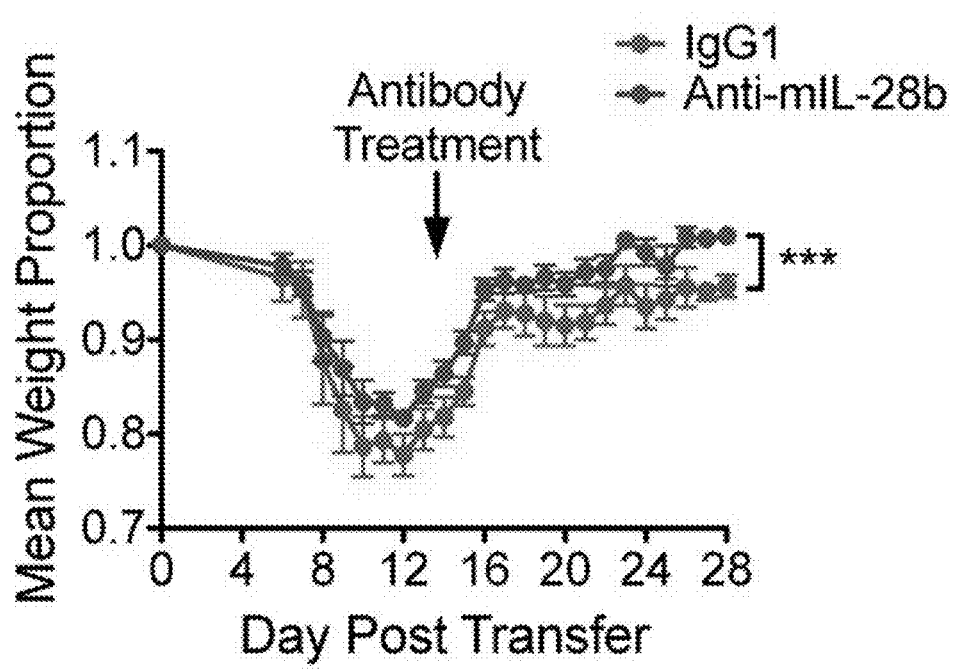

Since IFNλ signaling was nonessential during the development of inflammation, but critical for the maintenance of chronic encephalomyelitis, the expression of IFNλ could be increased in brain lesions of MS patients with SPMS, which is chronic and progressive, versus those with RRMS. Analysis of IFNλ within lesioned and normal appearing white matter (NAWM) of post-mortem MS specimens (TABLE 1) revealed an increase in endothelial expression of IFNλ in SPMS patients compared to those with RRMS (FIG. 3C). To determine the therapeutic relevance of targeting IFNλ, a neutralizing antibody was administered to mice following the acute phase of EAE. Compared to an IgG1 control, therapeutic neutralization of IL-28b (IFNλ3) resulted in EAE recovery (see e.g., FIG. 7D). Together, these data suggest that IFNλ contributes to ongoing CNS autoimmune inflammation and that IFNλ may serve as a novel therapeutic target during progressive MS.

TABLE 1

| Patient | Age (yrs) | Sex | PMI (hrs) | Diagnosis | CNS Region | Demyelination |
|---|---|---|---|---|---|---|
| A12-152 | 69 | F | 43 | Sepsis | Cortex | N |
| A12-210 | 41 | M | 24 | CA | Cortex | N |
| A98-40094 | 73 | M | 3 | CA | Cortex | N |
| A15-30 | 54 | F | 7 | RRMS | Putamen | Y |
| A15-30 | 54 | F | 7 | RRMS | Cortex | Y |
| A13-77 | 41 | F | 12 | RRMS | PVWM | Y |
| A10-58 | 65 | F | 11 | RRMS | PVWM | Y |
| A10-58 | 65 | F | 11 | RRMS | Cortex | Y |
| A12-271 | 50 | F | 20 | SPMS | Cortex | Y |
| A12-234 | 95 | F | 9 | SPMS | Cortex | Y |
| A08-305 | 70 | M | 8 | SPMS | PVWM | Y |
| A08-305 | 70 | M | 8 | SPMS | Cortex | Y |

PMI: post-mortem interval,
CA: cardiac arrest,
RRMS: relapsing-remitting MS,
SPMS: secondary progressive MS,
PVMW: periventricular white matter.

Methods

EAE induction. 8-9-wk-old female C57Bl/6 (The Jackson Laboratory) or Ifnlr1$^{-/-}$ mice (Bristol-Myers Squibb) (22, 43) were used for all experiments and maintained in specific pathogen-free conditions. WT, Ifnlr1$^{-/-}$ or Thy1.1+MOG35-55-specific Th1 clones were generated as previously described (44) and 10$^7$ cells were transferred to naïve recipients via retroorbital injection. Active immunization and clinical scoring was performed as previously described (45). All animal studies were performed in accordance with the Animal Care and Use Committee guidelines of the National Institutes of Health and were conducted under protocols approved by the Animal Care and Use Committee of Washington University.

IHC on murine CNS tissue. Frozen sections were prepared and detection of cell markers were accomplished as previously described (46). Briefly, tissue sections were blocked with goat or donkey serum and triton x (Sigma) for 1 h at room temperature and then exposed to anti-CD3 (1:200, BD),-Iba1 (1:250, Wako),-MOG (1:80, Invitrogen),-dMBP (1:2000, Millipore), or-SMI-32 (1:1000, Biolegend) overnight at 4° C. Secondary antibodies conjugated to Alexa 488 or Alexa 555 (1:400, Molecular Probes) were applied for 1 h at room temperature. Nuclei were counterstained with DAPI (Molecular Probes). Sections were analyzed using the 40× objective of a Zeiss LSM 880 confocal laser scanning microscope. The mean positive area was determined using appropriate isotype control antibodies and quantified using Volocity (Perkin Elmer) image analysis software.

Real-time qRT-PCR. Mice were perfused via cardiac puncture with RNAlater® Stabilization Solution (Ambion) and total RNA was prepared from spinal cord tissue using the RNeasy kit (QIAGEN) according to the manufacturer's instructions. qRT-PCR was performed using Power SYBR® Green PCR master mix (ThermoFisher) and primers specific for Ifnlr1 (22) and Ifnl3 (47). Calculated copies were normalized to GAPDH copy number as previously described (48). CNS leukocyte isolation and flow cytometric analysis. Following cardiac perfusion with PBS, cells were isolated from the spinal cords of WT or Ifnlr1$^{-/-}$ mice. Peripheral blood was collected using submandibular puncture and red blood cells were lysed. Cells were stained with fluorescently conjugated antibodies to CD4, Thy1.1, GM-CSF, IFNg, IL-17, IL-10, FoxP3, CD11b, CD45, CD11c, CD3, CD8, Ly6-C, CD14, CD19, MHCII, and CD80 as previously described (49). Data were collected using an LSR II flow cytometer (BD) and analyzed using FlowJo software (Tree Star).

Human subjects and postmortem IHC analysis. The Human Studies Committee of Washington University approved the use of human postmortem biopsies for this study. Postmortem CNS tissue from patients with clinically defined MS treated in the Washington University Multiple Sclerosis Center was analyzed. Frozen sections were hydrated and blocked in 0.1% Triton X-100 and 10% donkey serum, followed by incubation with rat anti-human CD31 (1:20, BD) and goat anti-human IFNI (1:25, R&D Systems) antibodies. Secondary antibodies conjugated to Alexa 488 or Alexa 555 (1:400, Molecular Probes) were applied for 1 h at room temperature. Nuclei were counterstained with DAPI (Molecular Probes). Images were acquired blinded to MS subtype.

In vivo administration of anti-IL-28b neutralizing antibody. Mice were randomized and on day 14 post-Th1 transfer, mice were anesthetized and 100 mg of neutralizing monoclonal mouse anti-IL-28b or 100 mg of a monoclonal mouse antibody specific for *E. coli* b-galactosidase (Invivo-Gen) was administered in 200 ml sterile PBS via retroorbital injection. Clinical scores and weight loss were monitored blindly.

Statistical analysis. Data were analyzed using Prism software (GraphPad). Clinical EAE data were analyzed by Mann-Whitney U test. Other experiments were analyzed with parametric tests (2-tailed Student's t test or one- or two-way ANOVA), with correction for multiple comparisons where appropriate. A P value of less than 0.05 was considered statistically significant. Data are expressed as means±SEM. Sample sizes are indicated in the figure legends.

REFERENCES

1. Zivadinov R, and Bakshi R. Role of MRI in multiple sclerosis I: inflammation and lesions. *Frontiers in bioscience: a journal and virtual library.* 2004; 9 (665-83.
2. Zurawski J, Lassmann H, and Bakshi R. Use of Magnetic Resonance Imaging to Visualize Leptomeningeal Inflammation in Patients With Multiple Sclerosis: A Review. *JAMA neurology.* 2017; 74 (1): 100-9.
3. Kermode A G, Thompson A J, Tofts P, MacManus D G, Kendall B E, 3. Kingsley D P, Moseley I F, Rudge P, and McDonald W I. Breakdown of the blood-brain barrier precedes symptoms and other MRI signs of new lesions in multiple sclerosis. Pathogenetic and clinical implications. *Brain.* 1990; 113 (Pt 5) (1477-89.
4. Fyfe I. Multiple sclerosis: New imaging marker of brain leukocyte infiltration. *Nature reviews Neurology.* 2017; 13 (1): 4-5.
5. Zhang J, Markovic-Plese S, Lacet B, Raus J, Weiner H L, and Hafler D A. Increased frequency of interleukin 2-responsive T cells specific for myelin basic protein and proteolipid protein in peripheral blood and cerebrospinal fluid of patients with multiple sclerosis. *J Exp Med.* 1994; 179 (3): 973-84.
6. Trapp B D, Peterson J, Ransohoff R M, Rudick R, Mork S, and Bo L. Axonal transection in the lesions of multiple sclerosis. *N Engl J Med.* 1998; 338 (5): 278-85.
7. Greter M, Heppner F L, Lemos M P, Odermatt B M, Goebels N, Laufer T, Noelle R J, and Becher B. Dendritic cells permit immune invasion of the CNS in an animal model of multiple sclerosis. *Nat Med.* 2005; 11 (3): 328-34.
8. Simpson J E, Newcombe J, Cuzner M L, and Woodroofe M N. Expression of monocyte chemoattractant protein-1 and other beta-chemokines by resident glia and inflammatory cells in multiple sclerosis lesions. *J Neuroimmunol.* 1998; 84 (2): 238-49.
9. Windhagen A, Newcombe J, Dangond F, Strand C, Woodroofe M N, Cuzner ML, and Hafler DA. Expression of costimulatory molecules B7-1 (CD80), B7-2 (CD86), and interleukin 12 cytokine in multiple sclerosis lesions. *J Exp Med.* 1995; 182 (6): 1985-96.
10. Bruck W, Porada P, Poser S, Rieckmann P, Hanefeld F, Kretzschmar H A, and Lassmann H. Monocyte/macrophage differentiation in early multiple sclerosis lesions. *Ann Neurol.* 1995; 38 (5): 788-96.
11. Hurwitz BJ. The diagnosis of multiple sclerosis and the clinical subtypes. *Annals of Indian Academy of Neurology.* 2009; 12 (4): 226-30.
12. Compston A, and Coles A. Multiple sclerosis. *Lancet.* 2008; 372 (9648): 1502-17.
13. Miller DH, and Leary SM. Primary-progressive multiple sclerosis. *The Lancet Neurology.* 2007; 6 (10): 903-12.
14. Goodin D S, Frohman E M, Garmany G P, Jr., Halper J, Likosky W H, Lublin F D, Silberberg D H, Stuart W H, van den Noort S, Therapeutics, et al. Disease modifying therapies in multiple sclerosis: report of the Therapeutics and Technology Assessment Subcommittee of the American Academy of Neurology and the MS Council for Clinical Practice Guidelines. *Neurology.* 2002; 58 (2): 169-78.
15. Wingerchuk D M, and Carter J L. Multiple sclerosis: current and emerging disease-modifying therapies and treatment strategies. *Mayo Clinic proceedings.* 2014; 89 (2): 225-40.
16 Feinstein A, Freeman J, and Lo AC. Treatment of progressive multiple sclerosis: what works, what does not, and what is needed. The Lancet Neurology. 2015; 14 (2): 194-207.
17. Lazear H M, Nice T J, and Diamond M S. Interferon-lambda: Immune Functions at Barrier Surfaces and Beyond. Immunity. 2015; 43 (1): 15-28.
18. Marziniak M, and Meuth S. Current perspectives on interferon Beta-1b for the treatment of multiple sclerosis. *Advances in therapy.* 2014; 31 (9): 915-31.
19 Kieseier B C. The mechanism of action of interferon-beta in relapsing multiple sclerosis. *CNS Drugs.* 2011; 25 (6): 491-502.
20 Yong V W, Chabot S, Stuve O, and Williams G. Interferon beta in the treatment of multiple sclerosis: mechanisms of action. *Neurology.* 1998; 51 (3): 682-9.
21 Minagar A, Long A, Ma T, Jackson T H, Kelley R E, Ostanin D V, Sasaki M, Warren A C, Jawahar A, Cappell B, et al. Interferon (IFN)-beta 1a and IFN-beta 1b block IFN-gamma-induced disintegration of endothelial junction integrity and barrier. *Endothelium: journal of endothelial cell research.* 2003; 10 (6): 299-307.
22. Lazear H M, Daniels B P, Pinto A K, Huang A C, Vick S C, Doyle S E, Gale M, Jr., Klein R S, and Diamond M S. Interferon-lambda restricts West Nile virus neuroinvasion by tightening the blood-brain barrier. *Science translational medicine.* 2015; 7 (284): 284ra59.
23 Koltsida O, Hausding M, Stavropoulos A, Koch S, Tzelepis G, Ubel C, Kotenko S V, Sideras P, Lehr H A, Tepe M, et al. IL-28A (IFN-lambda2) modulates lung DC function to promote Th1 immune skewing and suppress allergic airway disease. *EMBO molecular medicine.* 2011; 3 (6): 348-61.

24 Morrow M P, Yan J, Pankhong P, Ferraro B, Lewis M G, Khan A S, Sardesai N Y, and Weiner D B. Unique Th1/Th2 phenotypes induced during priming and memory phases by use of interleukin-12 (IL-12) or IL-28B vaccine adjuvants in rhesus macaques. *Clinical and vaccine immunology: CVI.* 2010; 17 (10): 1493-9.

25. Misumi I, and Whitmire J K. IFN-lambda exerts opposing effects on T cell responses depending on the chronicity of the virus infection. *J Immunol.* 2014; 192 (8): 3596-606.

26. Dai J, Megjugorac N J, Gallagher G E, Yu R Y, and Gallagher G. IFN-lambda1 (IL-29) inhibits GATA3 expression and suppresses Th2 responses in human naive and memory T cells. *Blood.* 2009; 113 (23): 5829-38.

27. Srinivas S, Dai J, Eskdale J, Gallagher G E, Megjugorac N J, and Gallagher G. Interferon-lambda1 (interleukin-29) preferentially down-regulates interleukin-13 over other T helper type 2 cytokine responses in vitro. *Immunology.* 2008; 125 (4): 492-502.

28 Wolk K, Witte K, Witte E, Raftery M, Kokolakis G, Philipp S, Schonrich G, Warszawska K, Kirsch S, Prosch S, et al. IL-29 is produced by T (H) 17 cells and mediates the cutaneous antiviral competence in psoriasis. *Science translational medicine.* 2013; 5 (204): 204ra129.

29. Jordan W J, Eskdale J, Srinivas S, Pekarek V, Kelner D, Rodia M, and Gallagher G. Human interferon lambda-1 (IFN-lambda1/IL-29) modulates the Th1/Th2 response. *Genes and immunity.* 2007; 8 (3): 254-61.

30. Mennechet F J, and Uze G. Interferon-lambda-treated dendritic cells specifically induce proliferation of FOXP3-expressing suppressor T cells. *Blood.* 2006; 107 (11): 4417-23.

31 Bettelli E, Dastrange M, and Oukka M. Foxp3 interacts with nuclear factor of activated T cells and NF-kappa B to repress cytokine gene expression and effector functions of T helper cells. *Proc Natl Acad Sci USA.* 2005; 102 (14): 5138-43.

32. Liu Y, Teige I, Birnir B, and Issazadeh-Navikas S. Neuron-mediated generation of regulatory T cells from encephalitogenic T cells suppresses EAE. *Nat Med.* 2006; 12 (5): 518-25.

33. Codarri L, Gyulveszi G, Tosevski V, Hesske L, Fontana A, Magnenat L, Suter T, and Becher B. RORgammat drives production of the cytokine GM-CSF in helper T cells, which is essential for the effector phase of autoimmune neuroinflammation. *Nat Immunol.* 2011; 12 (6): 560-7.

34. Ponomarev E D, Shriver L P, Maresz K, Pedras-Vasconcelos J, Verthelyi D, and Dittel B N. GM-CSF production by autoreactive T cells is required for the activation of microglial cells and the onset of experimental autoimmune encephalomyelitis. *J Immunol.* 2007; 178 (1): 39-48.

35. Ding S, Khoury-Hanold W, Iwasaki A, and Robek M D. Epigenetic reprogramming of the type III interferon response potentiates antiviral activity and suppresses tumor growth. *PLoS biology.* 2014; 12 (1): e1001758.

36 Greter M, Lelios I, and Croxford A L. Microglia Versus Myeloid Cell Nomenclature during Brain Inflammation. *Front Immunol.* 2015; 6 (249. Vainchtein I D, Vinet J, Brouwer N, Brendecke S, Biagini G, Biber K, 37. Boddeke H W, and Eggen B J. In acute experimental autoimmune encephalomyelitis, infiltrating macrophages are immune activated, whereas microglia remain immune suppressed. *Glia.* 2014; 62 (10): 1724-35.

38. Edelson B T, Bradstreet T R, Kc W, Hildner K, Herzog J W, Sim J, Russell J H, Murphy T L, Unanue E R, and Murphy K M. Batf3-dependent CD11b(low/−) peripheral dendritic cells are GM-CSF-independent and are not required for Th cell priming after subcutaneous immunization. *PLoS One.* 2011; 6 (10): e25660.

39. Jordan W J, Eskdale J, Boniotto M, Rodia M, Kellner D, and Gallagher G. Modulation of the human cytokine response by interferon lambda-1 (IFN-lambda1/IL-29). *Genes and immunity.* 2007; 8 (1): 13-20.

40 Auffray C, Fogg D, Garfa M, Elain G, Join-Lambert O, Kayal S, Sarnacki S, Cumano A, Lauvau G, and Geissmann F. Monitoring of blood vessels and tissues by a population of monocytes with patrolling behavior. *Science.* 2007; 317 (5838): 666-70.

41. Van Der Voorn P, Tekstra J, Beelen R H, Tensen C P, Van Der Valk P, and De Groot CJ. Expression of MCP-1 by reactive astrocytes in demyelinating multiple sclerosis lesions. *Am J Pathol.* 1999; 154 (1): 45-51.

42. Kotenko S V, Gallagher G, Baurin V V, Lewis-Antes A, Shen M, Shah N K, Langer J A, Sheikh F, Dickensheets H, and Donnelly RP. IFN-lambdas mediate antiviral protection through a distinct class II cytokine receptor complex. *Nature immunology.* 2003; 4 (1): 69-77.

43. Ank N, Iversen M B, Bartholdy C, Staeheli P, Hartmann R, Jensen U B, Dagnaes-Hansen F, Thomsen A R, Chen Z, Haugen H, et al. An important role for type III interferon (IFN-lambda/IL-28) in TLR-induced antiviral activity. *J Immunol.* 2008; 180 (4): 2474-85.

44. Lees J R, Golumbek P T, Sim J, Dorsey D, and Russell J H. Regional CNS responses to IFN-gamma determine lesion localization patterns during EAE pathogenesis. *The Journal of experimental medicine.* 2008; 205 (11): 2633-42.

45 Cruz-Orengo L, Chen Y J, Kim J H, Dorsey D, Song S K, and Klein R S. CXCR7 antagonism prevents axonal injury during experimental autoimmune encephalomyelitis as revealed by in vivo axial diffusivity. *Journal of neuroinflammation.* 2011; 8 (170.

46 Williams J L, Patel J R, Daniels B P, and Klein R S. Targeting CXCR7/ACKR3 as a therapeutic strategy to promote remyelination in the adult central nervous system. The Journal of experimental medicine. 2014; 211 (5): 791-9.

47 Lasfar A, Lewis-Antes A, Smirnov S V, Anantha S, Abushahba W, Tian B, Reuhl K, Dickensheets H, Sheikh F, Donnelly R P, et al. Characterization of the mouse IFN-lambda ligand-receptor system: IFN-lambdas exhibit antitumor activity against B16 melanoma. *Cancer research.* 2006; 66 (8): 4468-77.

48 Klein R S, Lin E, Zhang B, Luster A D, Tollett J, Samuel M A, Engle M, and Diamond M S. Neuronal CXCL10 directs $CD8^+$T-cell recruitment and control of West Nile virus encephalitis. Journal of virology. 2005; 79 (17): 11457-66.

49. McCandless E E, Wang Q, Woerner B M, Harper J M, and Klein R S. CXCL12 limits inflammation by localizing mononuclear infiltrates to the perivascular space during experimental autoimmune encephalomyelitis. J Immunol. 2006; 177 (11): 8053-64.

Example 2: Targeting Interferon Lambda (Ifnλ) to Prevent Axonal Injury and Disease Progression in Multiple Sclerosis (MS)

A humanized monoclonal antibody can be developed that specifically targets IFNλ and can be used to prevent axonal injury and disease progression in progressive forms of multiple sclerosis (MS). This drug should have an equilibrium dissociation constant ($K_D$) in the nanomolar range with low immunogenicity. Patients chosen for the study have progressive forms of MS as defined by standard criteria. Evidence of PoM would include lack of disease progression and of new MRI lesions.

Herein are described new methods for the detection and blockade of IFNλ, a new biomarker of progressive forms of MS that, when targeted, can prevent neuronal injury and promote recovery from autoimmune attack of the brain and spinal cord in an animal model of MS. MS is an inflammatory disease of the central nervous system (CNS) characterized by invasion of leukocytes that cause injury of the myelin sheath, leading to axonal damage. Most patients present with relapsing-remitting MS (RRMS), in which disease begins with episodes of neurological dysfunction followed by partial or complete remission, and later progresses to secondary progressive MS (SPMS) with fewer remissions and increasing clinical deterioration. An additional form of MS is primary progressive (PP) MS, in which patients develop continued worsening of disease and neurologic deficits from the time of diagnosis. RRMS is thought of as an immune-mediated inflammatory subtype of MS, while progressive forms of MS typically have less inflammation and a more prominent neurodegenerative component. Thus, it is not surprising that the approved immunomodulatory therapies, all of which target inflammation, have demonstrated efficacy for RRMS and are ineffective in patients with progressive forms of MS. There are currently no therapies to prevent axonal injury and disease progression in MS. A murine anti-IFNλ neutralizing antibody can prevent axonal injury and promote complete recovery from disease in a murine model of MS (see e.g., Example 1). Under development is a humanized monoclonal antibody that targets IFNλ, which would be the first-in-class drug that would limit or even halt the progression of MS. This humanized monoclonal antibody (mAb) with high specificity against IFNλ may be administered monthly to patients, similar to several current MS therapies on the market.

Here is described the first biological readout in clinic (proof of mechanism). Patients with MS currently present as one of four possible disease courses: 1) clinically isolated syndrome (one episode of neurologic dysfunction with complete recovery); 2) relapsing-remitting MS (episodes of neurologic deficit are followed by complete remission with recovery); 3) secondary progressive (SP) MS (RRMS followed by a year-long period without remission and progressive neurologic deficits); and 4) primary progressive (PP) MS (continued progression of neurologic deficits from the time of initial diagnosis). Diagnosis of all forms of MS also required MRI evidence of inflammatory lesions and CSF studies consistent with MS. The first clinical study would recruit patients with SPMSS and PPMS, as defined above. Patients treated with anti-IFNλ therapies would undergo neurologic evaluations and neuroimaging to determine efficacy of treatment. As there are currently no therapies available to halt the progression of MS in these patients, this drug is clinically distinguished from drugs that treat RRMS or single exacerbations of MS.

The objective described herein is the generation of humanized mAbs with high specificity for human IFNλ, which exists in three forms (IFNλ1, IFNλ2, IFNλ3). An anti-murine, neutralizing antibody against IFNλ3 was tested in a murine model of MS with promising preliminary results (see e.g., FIG. 7). It is unclear, however, which IFNλ isoform is expressed within the CNS of MS patients. Thus, to accomplish the objective, the following will be accomplished: 1) Determine levels of IFNλ isoforms in the cerebrospinal fluid of MS patients of various subtypes (RRMS, SPMS, PPMS); 2) generate novel murine mAbs against IFNλ isoforms for in vitro evaluation of specificity; 3) test anti-IFNλ mAbs with high specificity for in vivo efficacy in preventing axonal injury and promoting recovery from CNS autoimmunity in mice with EAE; and 4) humanization of anti-IFNλ mAb with highest specificity and in vivo clinical efficacy.

The following assays are available: anti-human IFNλ1, 2, and 3 ELISA kits (R&D Systems) can be used to evaluate levels of these proteins within the cerebrospinal fluid of MS patients. A biorepository has been established of cerebrospinal fluid specimens from patients will all subtypes of MS, with currently 420 frozen CSF specimens, predominantly from MS patients. To generate anti-IFNλ mAbs, IFNλ3-deficient mice (Jackson Laboratories) can be immunized with murine IFNλ1, 2, or 3 (R&DSystems). Subsequently, hybridoma development and screening of monoclonal antibodies will be performed. Screening comprises initial ELISA screening, which can be followed up by Western Blot and immunocytochemical screening for antibody specificity. Assays can also be performed to determine whether pK of mAbs is suitable for a drug candidate. mAbs with highest specificity can be evaluated for efficacy in preventing axonal injury and promoting recovery in mice with EAE (see e.g., FIG. 7). Identified mAbs can be humanized for drug development.

What is claimed is:

1. A method of protecting neurons in a subject, comprising administering an interferon λ (IFNλ) inhibiting agent comprising an IFNλ neutralizing antibody construct in an amount effective to neutralize IFNλ to a subject in need thereof, wherein the IFNλ neutralizing antibody construct is a Type III interferon neutralizing antibody construct.

2. The method of claim 1, wherein neuronal protection comprises the prevention of nerve damage or decreasing central nervous system (CNS) autoimmune inflammation.

3. The method of claim 2, wherein the CNS autoimmune inflammation results from a CNS autoimmune disease, disorder, or condition.

4. The method of claim 3, wherein the CNS autoimmune disease, disorder, or condition is multiple sclerosis (MS).

5. The method of claim 3, wherein the CNS autoimmune disease, disorder, or condition is selected from the group consisting of relapsing-remitting MS (RRMS), secondary progressive MS (SPMS), primary-progressive MS (PPMS), or progressive-relapsing MS (PRMS).

6. The method of claim 1, wherein the amount of an IFNλ inhibiting agent effective to neutralize IFNλ is an amount resulting in neuronal protection; reduction or prevention of nerve damage; reduction or prevention of CNS autoimmune inflammation; or amelioration of the clinical severity of autoimmune encephalomyelitis, wherein the amelioration of the clinical severity of autoimmune encephalomyelitis includes amelioration of inflammation, demyelination, axonal loss, or gliosis.

7. The method of claim 1, wherein the IFNλ inhibiting agent comprises a small molecule IFNλ inhibitor, IFNλ siRNA, IFNλ sgRNA, IFNλ shRNA, zinc, or a viral protein antagonist of IFNλ.

8. The method of claim 1, wherein the IFNλ inhibiting agent comprises a small molecule IFNLR1 inhibitor, IFNLR1 siRNA, IFNLR1 sgRNA, IFNLR1 shRNA, zinc, or a viral protein antagonist of IFNLR1.

9. The method of claim 1, wherein the IFNλ inhibiting agent is an IFNλ neutralizing antibody or construct thereof.

10. The method of claim 1, wherein the IFNλ inhibiting agent is an anti-IFNλ antibody.

11. The method of claim 1, wherein the IFNλ inhibiting agent is an anti-IFNLR1 antibody.

12. The method of claim 1, wherein the IFNλ inhibiting agent is an IFNλ3 neutralizing antibody or an IFN\2 and IFNλ3 neutralizing antibody.

13. The method of claim 1, wherein the IFNλ inhibiting agent is an IFNLR1-Fc fusion protein.

14. A method of neutralizing interferon λ (IFNλ) in a subject having multiple sclerosis (MS), comprising administering an IFNλ inhibiting agent comprising an IFNλ neutralizing antibody construct in an amount effective to neutralize IFNλ to a subject in need thereof, wherein the IFNλ neutralizing antibody construct is a Type III interferon neutralizing antibody construct.

15. The method of claim 14, wherein the IFNλ inhibiting agent is anti-IFN-A3 and the anti-IFN-A3 reduces or prevents CNS autoimmune inflammation or nerve damage.

16. The method of claim 14, wherein the IFNλ inhibiting agent is an IFNλ neutralizing antibody or a construct thereof.

17. The method of claim 14, wherein the IFNλ inhibiting agent is an anti-IFNλ antibody.

18. The method of claim 14, wherein the IFNλ inhibiting agent is an anti-IFNLR1 antibody.

19. The method of claim 14, wherein the IFNλ inhibiting agent is an IFN\3 neutralizing antibody or an IFNλ2 and IFNλ3 neutralizing antibody.

20. The method of claim 14, wherein the IFNλ inhibiting agent is an IFNLR1-Fc fusion protein.

* * * * *